United States Patent
Salter

(10) Patent No.: US 7,521,619 B2
(45) Date of Patent: Apr. 21, 2009

(54) SYSTEM AND METHOD OF INSTRUCTING MUSICAL NOTATION FOR A STRINGED INSTRUMENT

(75) Inventor: Hal C. Salter, Seffner, FL (US)

(73) Assignee: Allegro Multimedia, Inc., Seffner, FL (US)

( * ) Notice: Subject to any disclaimer, the term of this patent is extended or adjusted under 35 U.S.C. 154(b) by 76 days.

(21) Appl. No.: 11/737,734

(22) Filed: Apr. 19, 2007

(65) Prior Publication Data

US 2007/0256540 A1    Nov. 8, 2007

Related U.S. Application Data

(60) Provisional application No. 60/745,763, filed on Apr. 27, 2006, provisional application No. 60/793,353, filed on Apr. 19, 2006.

(51) Int. Cl.
G09B 15/00 (2006.01)
G09B 15/02 (2006.01)
G10H 1/00 (2006.01)

(52) U.S. Cl. ............... 84/477 R; 84/470 R; 84/479 R; 84/483.2; 84/485 R

(58) Field of Classification Search .................. None
See application file for complete search history.

(56) References Cited

U.S. PATENT DOCUMENTS

| | | | |
|---|---|---|---|
| 3,662,641 | A | 5/1972 | Bulla, Jr. |
| 3,837,256 | A | 9/1974 | Gullickson |
| 3,897,711 | A | 8/1975 | Elledge |
| 3,991,648 | A | 11/1976 | Karpowicz |
| D255,803 | S | 7/1980 | Leal |
| D256,366 | S | 8/1980 | Dworsky |
| 4,235,141 | A | 11/1980 | Eventoff |
| 4,339,979 | A | 7/1982 | Norman |
| RE31,019 | E | 8/1982 | Evangelista |
| 4,430,918 | A | 2/1984 | Meno |
| 4,559,861 | A * | 12/1985 | Patty et al. ............... 84/470 R |
| 4,570,521 | A | 2/1986 | Fox |

(Continued)

FOREIGN PATENT DOCUMENTS

EP    1569185    8/2005

(Continued)

Primary Examiner—Marlon T Fletcher
(74) Attorney, Agent, or Firm—Advantia Law Group; Michael W. Starkweather; Jason P. Webb

(57) ABSTRACT

A system and method of instructing a user to read musical notation through interaction with a graphical user interface and an input instrument representative of a stringed instrument comprising a plurality of modes of instruction which progressively direct and alter characteristics of the user interface to more closely resemble standard musical notation. The graphical user interface includes a virtual fingerboard having linear arrays representing frequency ranges and note positions. The note positions and linear arrays may be coded indexed to a chromatic scale and may directly correspond to fingerboard positions on an input instrument. A game object is directed toward the virtual fingerboard in accordance with a music file is incorporated in the graphical user interface which contains data corresponding to notes in sequence that have a rhythmic pattern of arrangement coinciding with the virtual fingerboard. An evaluation of the user's performance is provided based on striking the input instrument.

19 Claims, 20 Drawing Sheets

U.S. PATENT DOCUMENTS

| | | | |
|---|---|---|---|
| 4,763,558 A | 8/1988 | Johnson, Jr. | |
| 4,794,838 A | 1/1989 | Corrigau, III | |
| D310,090 S | 8/1990 | Stone et al. | |
| D312,264 S | 11/1990 | Amiya | |
| 5,040,447 A | 8/1991 | Murata et al. | |
| 5,085,119 A | 2/1992 | Cole | |
| 5,095,799 A | 3/1992 | Wallace et al. | |
| 5,121,668 A | 6/1992 | Newsome et al. | |
| 5,162,603 A | 11/1992 | Bunker | |
| 5,167,179 A | 12/1992 | Yamauchi et al. | |
| 5,214,231 A | 5/1993 | Ernst et al. | |
| D349,127 S | 7/1994 | Nelson | |
| 5,373,768 A | 12/1994 | Sciortino | |
| 5,380,948 A | 1/1995 | Freimuth | |
| 5,401,898 A | 3/1995 | Usa et al. | |
| 5,403,972 A | 4/1995 | Valentine, Sr. | |
| 5,496,179 A | 3/1996 | Hoffman | |
| 5,644,096 A | 7/1997 | Bull | |
| 5,691,490 A | 11/1997 | Williams | |
| 5,777,251 A | 7/1998 | Hotta et al. | |
| 5,796,025 A | 8/1998 | Haake | |
| 6,018,119 A | 1/2000 | Mladek | |
| 6,107,557 A | 8/2000 | Fukada | |
| 6,162,981 A * | 12/2000 | Newcomer et al. | 84/485 R |
| 6,188,008 B1 | 2/2001 | Fukata | |
| 6,201,174 B1 * | 3/2001 | Eller | 84/477 R |
| 6,225,544 B1 | 5/2001 | Sciortino | |
| 6,225,547 B1 | 5/2001 | Toyama et al. | |
| 6,252,153 B1 | 6/2001 | Toyama | |
| 6,255,547 B1 | 7/2001 | Smuda | |
| 6,323,411 B1 | 11/2001 | Fukata | |
| 6,337,433 B1 | 1/2002 | Nishimoto | |
| 6,342,665 B1 | 1/2002 | Okita et al. | |
| 6,380,474 B2 | 4/2002 | Taraguchi et al. | |
| 6,390,923 B1 | 5/2002 | Yoshitomi et al. | |
| 6,444,891 B1 | 9/2002 | Koo | |
| 6,452,080 B1 | 9/2002 | Coonce | |
| 6,452,081 B1 | 9/2002 | Ravagni et al. | |
| 6,501,011 B2 | 12/2002 | Wesley | |
| 6,515,211 B2 | 2/2003 | Umezawa et al. | |
| 6,541,688 B2 | 4/2003 | Asahi | |
| 6,541,692 B2 | 4/2003 | Miller | |
| 6,555,737 B2 | 4/2003 | Miyaki et al. | |
| 6,605,767 B2 | 8/2003 | Fiks et al. | |
| 6,660,921 B2 | 12/2003 | Deverich | |
| 6,660,922 B1 | 12/2003 | Roeder | |
| 6,781,049 B2 | 8/2004 | Taylor | |
| 6,791,568 B2 | 9/2004 | Steinberg-Grimm | |
| 6,821,203 B2 | 11/2004 | Suga et al. | |
| 6,915,488 B2 | 7/2005 | Omori et al. | |
| 6,987,220 B2 | 1/2006 | Holcombe | |
| 6,995,310 B1 | 2/2006 | Knapp et al. | |
| 7,026,538 B2 | 4/2006 | Komano et al. | |
| 7,109,407 B2 | 9/2006 | Hasegawa | |
| 7,129,407 B2 | 10/2006 | Hiratsuka et al. | |
| 7,174,510 B2 | 2/2007 | Salter | |
| 7,186,910 B2 | 3/2007 | Sakurai et al. | |
| 2002/0011142 A1 * | 1/2002 | Mead | 84/477 R |
| 2002/0029681 A1 | 3/2002 | Manning | |
| 2002/0194983 A1 | 12/2002 | Tanner | |
| 2003/0131721 A1 | 7/2003 | Minakuchi et al. | |
| 2004/0074379 A1 | 4/2004 | Ludwig | |
| 2004/0112204 A1 | 6/2004 | Javelle | |
| 2004/0206225 A1 | 10/2004 | Wedel | |
| 2005/0016353 A1 * | 1/2005 | Reierson | 84/314 R |
| 2005/0034591 A1 | 2/2005 | Chang | |
| 2005/0126368 A1 | 6/2005 | Harrison | |
| 2005/0172785 A1 | 8/2005 | Fisher-Robbins et al. | |
| 2005/0183566 A1 | 8/2005 | Nash | |
| 2005/0183567 A1 | 8/2005 | Aoki et al. | |
| 2006/0191399 A1 | 8/2006 | Miyaki | |
| 2006/0196343 A1 * | 9/2006 | Yung | 84/470 R |

FOREIGN PATENT DOCUMENTS

| | | |
|---|---|---|
| JP | 8063166 | 8/1994 |
| JP | 8179685 | 12/1994 |
| JP | 2004117789 | 7/1995 |
| JP | 2003015639 | 3/1997 |
| JP | 09073294 | 10/2000 |
| JP | 2000288254 | 1/2001 |
| JP | 07181962 | 10/2001 |
| JP | 2001013959 | 1/2003 |
| JP | 2001272983 | 4/2004 |

* cited by examiner

SYSTEM AND METHOD OF INSTRUCTING MUSICAL NOTATION FOR A STRINGED INSTRUMENT

CROSS-REFERENCE TO RELATED APPLICATIONS

This invention claims priority, under 35 U.S.C. § 120, to the U.S. Provisional Patent Application No. 60/793,353 filed on Apr. 19, 2006 and Provisional Patent Application No. 60/745,763 filed on Apr. 27, 2006, which are each incorporated by reference herein.

BACKGROUND OF THE INVENTION

1. Field of the Invention

The present invention relates to systems and methods of instructing music, specifically to systems and methods of instructing musical literacy and musical performance for stringed instruments.

2. Description of the Related Art

Current standard musical notation has incrementally evolved from indicating a small series of notes with extended fingers. As musical theory evolved and western culture explored musical performance there developed a need to indicate a greater variety of notes and timings. Additionally, performers and composers established standard modes of notation to facilitate recording and performing for those having expertise in musical notation. Accordingly, musical notation has become a powerful and useful way to communicate through music. However, this tool has become very difficult for those without expertise to learn.

In particular, musical instrument interfaces are very different from standard musical notation. Accordingly, it is difficult for a new user to draw a correlation between actions performed on the instrument and instructions on a page. This is particularly true for stringed instruments. Stringed instruments generally include an array of strings arranged to allow a user to sound multiple strings at the same time while selecting notes by effectively shortening string length. Further, such strings are generally tuned to provide an overlapping frequency range between strings to facilitate a particular style of play. Even more, in a typical instruction session, a student faces an instructor and watches how the instructor plays. The student must then mentally invert the viewed actions before practicing. Accordingly, a student of stringed instruments faces great difficulties in learning to read music and in learning to play.

More, common methods of instructing musical notation and musical performance typically require a substantial investment in time and effort before substantial results may be observed. Accordingly, many give up learning the language of music. As a result, while music is a natural human expression, few are able to feel confident enough to participate at any level higher than audience.

The difficulties in learning to perform music and read musical notation are many. Indeed, a beginning student may spend considerable time and effort in simply becoming familiar with even the basic motions of playing a musical instrument. Some of these challenges facing beginning students include: learning notes and pitches, hand and fingering positions, and reading and understanding the music and music notation associated with the particular instrument. In many cases, the challenges a beginning student faces may considerably decrease a student's enjoyment and desire to put in the necessary time and effort to become proficient.

Beginning students of stringed musical instruments, such as the violin, guitar, cello, etc., face the additional challenge of coordinating hand positions, pitches, with the printed music. Indeed, even if a student already knows how to read music, they still must learn which finger to use on which string, and in which hand position along the fingerboard they should place their fingers in order to produce the desired notes. Accordingly, many tools have been developed to further automate or otherwise facilitate musical instrument instruction.

In particular, with the advent of the computer, musical notation and other instruction software has been developed with the purpose of simplifying and instructing a person to play and enjoy stringed musical instruments. Electronics and computer-related technologies such as MIDI (Musical Instrument Digital Interface) have been increasingly applied to musical instrument over the years; thus greatly enhancing the ability for learning, creating, playing, and understanding stringed instrument musical compositions.

Many advances have been made in facilitating musical performance and in learning musical notation. Examples include, but are not limited to, the references described below, which references are incorporated by reference herein:

U.S. Pat. No. 7,174,510, issued to Salter, discloses a musical keyboard is connected to a computer. The computer implements a graphical user interface for teaching users to play the musical instrument. A computer readable music file, such as a MIDI file, is used to drive the creation of game objects that travel from a point of origination along a path toward a key of a virtual keyboard. In one form, when a user presses a key of the musical keyboard within a certain time window of arrival of the game object at the corresponding key of the virtual keyboard, the user is awarded with an audio presentation, a visual presentation and/or with game points.

U.S. Pat. No. 6,018,119, issued to Mladek, discloses a stringless fret instrument to be played as on a twitch instrument consists of the neck on which there are frets located transversely to a lengthwise axis of the neck, between which there are situated, in rows parallel with the axis of the neck, digital tone push-buttons, and of the body equipped with the management of the synthesizer accompaniment, a loudspeaker and a direct current charger. Above each row of digital tone push-buttons, there is a flexible rope situated in a lengthwise rabbet created in the neck parallel with the lengthwise axis of the neck movable in the direction to digital tone push-buttons, fixed at least on the neck behind the side digital tone push-button. The management of the synthesizer accompaniment consists of three mutually parallel rows of keys each of which consisting of four tone keys.

U.S. Pat. No. 7,026,538, issued to Komano et al., discloses a tone generation apparatus is removably attachable to a plug-in board for generating a tone on the basis of performance information and extending the tone generating function of the tone generation apparatus. Tone color name information and tone color parameter name information of tone color data possessed by the attached plug-in board is stored in a nonvolatile memory. The nonvolatile memory can also store tone color data of a custom voice obtained by editing original tone color data of the plug-in board.

U.S. Pat. No. 6,605,767, issued to Fiks et al., discloses a musical learning system including an instrument and method is disclosed. The instrument is comprised of a rectangularly shaped box designed for convenient handling by an operator in a manner analogous to other musical instruments such as a piano, a guitar, or a horn. Thirteen movable buttons on the top surface of the box sound eight natural notes and five notes of sharps and flats when pressed by the operator, the sounds being produced by either a built-in, acoustic or electronic sound system. Removable attachments having instructive musical notations are temporarily secured above and below the buttons can be used in a predetermined sequence. In addition, in the electronic version, an "octave-up" switch enables an operator to sound a note one or more octaves higher for each of the buttons; and a "mute" bar allows the operator to silence a note being produced, if desired.

U.S. Pat. No. 6,515,211, issued to Umezawa et al, discloses a display device is supplied with basic screen display data for displaying a basic screen including a plurality of chord names to be indicated on the basic screen, and displays the basic screen on the basis of the basic screen display data. For example, the basic screen may be one listing names of chords to be used in a selected music piece in accordance with progression of the selected music piece. There is provided a memory storing, for each chord, playing-manner screen display data for displaying a playing manner screen indicative of a model playing manner corresponding to the chord. On the basis of an instruction by a user, a desired chord is selected from among the plurality of chord names indicated on the basic screen displayed on the display device, and the playing-manner screen display data corresponding to the selected chord name are read out from the memory. The display device displays, along with the basic screen, the playing manner screen indicative of the model playing manner corresponding to the selected chord name on the basis of the playing-manner screen display data read out from the memory. The display device may simultaneously display playing manner screens for a plurality of different chords. Also, the display device may display the playing manner screen in a highlighted fashion.

U.S. Patent Application Publication No.: 2006/0191399, by Miyaki, discloses a fingering guidance image for guiding a fingering upon performing a chord of a stringed instrument to a user is displayed on a display device. This fingering guidance image includes a musical instrument image indicating a guitar, a depressed pointer arranged at the position in the musical instrument image that is depressed upon performing a chord and a fingering image indicating fingers in the form of performing a chord, among which the fingering image is made to be a transmitting image.

Many inventions heretofore known suffer from a number of disadvantages which include: difficulty of use, especially for younger users; a high learning curve; failure to provide an intuitive interface; failure to enhance and create learning enjoyment; failure to provide sufficient guidance and/or skill enhancing effects; and/or so forth.

What is needed is a system and method of instructing and displaying musical notation for a stringed instrument that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available systems and methods of instructing and displaying musical notation. Accordingly, the present invention has been developed to provide a method, apparatus, device, and/or system of instructing musical notation and/or musical performance for stringed instruments.

In one embodiment, there is a method and/or computer readable storage medium comprising computer readable program code for instructing a user to read musical notation through interaction with a graphical user interface and an input instrument representative of a stringed instrument and configured to execute on a processor. The program code and/or method includes instructions for instructing a user to read musical notation through interaction with a graphical user interface and an input instrument representative of a stringed instrument. The method and/or program code may comprise one or more of the following steps: generating the graphical user interface, having a first mode, including a virtual fingerboard positioned substantially along a vertical extreme of the interface. The virtual fingerboard may include: a first linear array representing a first string having a first frequency range; a second linear array representing a second string having a second frequency range, wherein the second frequency range overlaps the first frequency range; and/or a plurality of note positions, each note position having a corresponding fingerboard position on the input instrument. The first linear array, the second linear array, and the plurality of note positions may form a grid. The method may additionally include: displaying the first linear array and the second linear array in a second mode such that portions of the first linear array and the second linear array having overlapping frequency ranges are substantially vertically aligned; incorporating a music file into the graphical user interface, wherein the music file contains data corresponding to an arrangement of a plurality of musical notes in sequence, having a rhythmic pattern, and represented by at least one game object; and/or directing the game object in substantially vertical and substantially straight trajectory, toward a note position on the virtual fingerboard corresponding to the musical notes.

In another embodiment, there is a system and/or apparatus for instructing a user to read musical notation through interaction with a graphical user interface and an input instrument representative of a stringed instrument. The system and/or apparatus may comprise: a display module configured to display data; an input instrument module representative of a stringed instrument and in communication with the display module. The input instrument module may have a fingerboard, the fingerboard including a plurality of note positions, each note position being color indexed to a chromatic scale; a control module in communication with the display module, and/or comprising instructions for directing the display module; and/or a graphical user interface module. The graphical user interface module may comprise instructions for: generating a virtual fingerboard positioned substantially at a top portion of the interface. The virtual fingerboard may include: a first linear array representing a first string having a first frequency range; a second linear array representing a second string having a second frequency range, wherein the second frequency range overlaps the first frequency range; and/or a plurality of note positions, each note position having a corresponding fingerboard position on the input instrument; wherein the first linear array, the second linear array, and/or the plurality of note positions form a grid. Further, the graphical user interface module may include instructions for displaying the first linear array and/or the second linear array in a second mode such that portions of the first linear array and/or the second linear array having overlapping frequency ranges are substantially vertically aligned.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). Understanding that these drawing(s) depict only typical embodiments of the invention and are not therefore to be considered to be limiting of its scope, the invention will be described and explained with additional specificity and detail through the use of the accompanying drawing(s), in which.

DETAILED DESCRIPTION OF THE INVENTION

Figure 1:
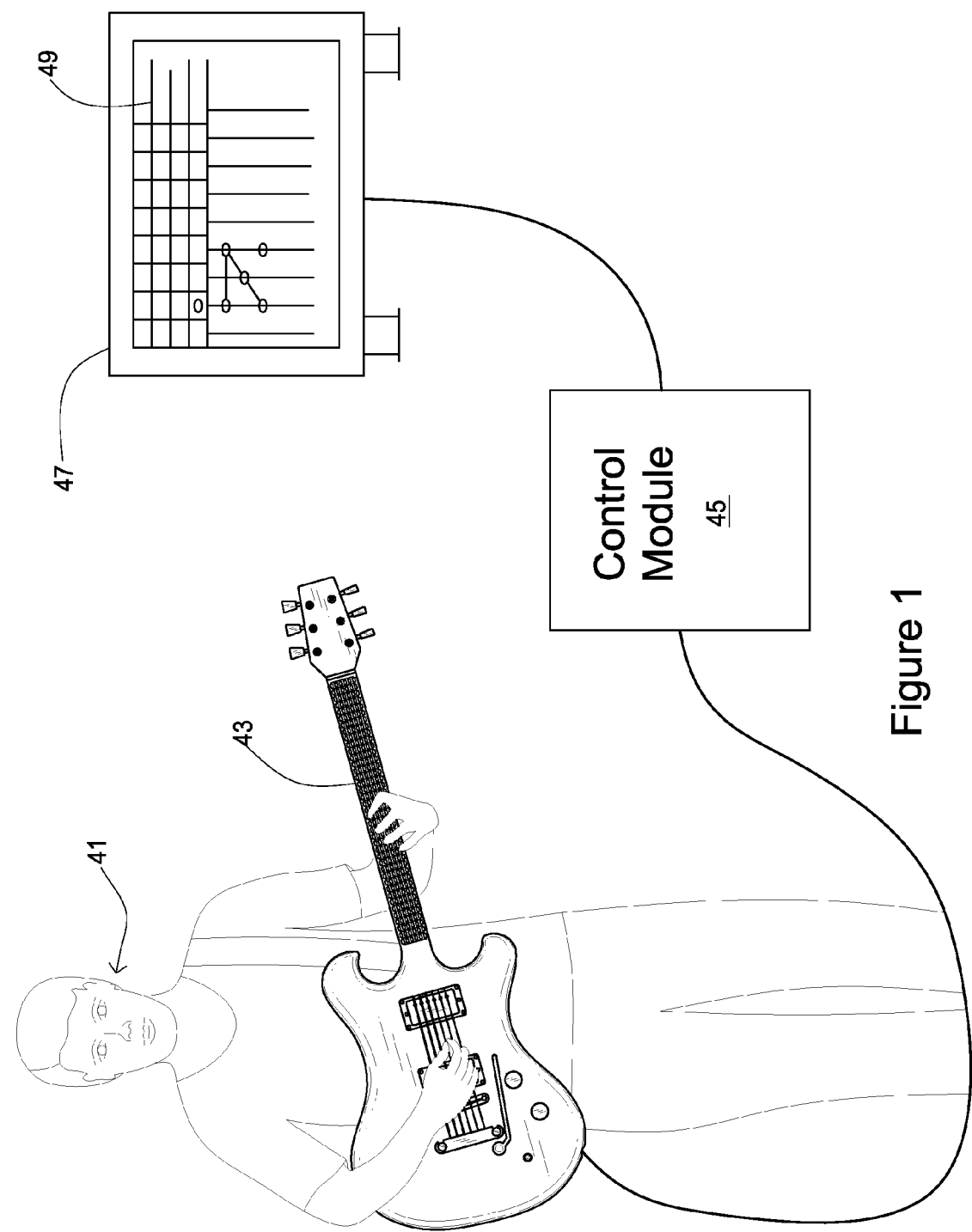
FIG. 1 is an operational view of a system for instructing and displaying musical notation for a stringed instrument, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is," "are," "characterized by," and grammatical equivalents thereof are inclusive or open-ended terms that do not exclude additional unrecited elements or method steps. "Comprising"

is to be interpreted as including the more restrictive terms "consisting of" and "consisting essentially of."

MIDI defines an interface for exchanging information between electronic musical instruments, computers, sequencers, lighting controllers, mixers, and tape recorders as discussed in MIDI Manufacturers Association publication entitled, MIDI 1.0 Detailed Specification (1990). MIDI is extensively used both in the recording studio and in live performances and has had enormous impact in the areas of studio recording and automated control, audio video production and composition. By itself and in conjunction with other media, MIDI plays an integral role in the application of computers to multimedia applications.

In comparison to digital audio, MIDI files take up much less space and the information is symbolic for convenient manipulation and viewing. For example, a typical three minute MIDI file may require 30 to 60 Kilobytes on a disk, whereas a CD quality stereo audio file requires about two hundred Kilobytes per second or 36 Megabytes for three minutes. MIDI data may appear as musical notation, graphical piano-roll, or lists of messages suitable for editing and reassignment to different instruments.

General MIDI has standardized instrument assignments to greatly motivate the multimedia title producer. MIDI input and output ports are used to route time-stamped MIDI packets from one media component to another. MIDI ports act as mailboxes for the communication of MIDI packets across address spaces. Many interesting MIDI applications can be created by connecting media components that contain MIDI ports. For example, a MIDI player and a MIDI interface can be used to play a music device, like an electronic player piano or a guitar, connected to a computer. MIDI packets are sent from the MIDI player to the MIDI interface. The MIDI interface converts the MIDI packets to MIDI data that is sent to the player instrument piano or guitar for playback.

Additionally, certain MIDI files and songs are already broken up into 'tracks' or channels which may be the equivalent of voice, or orchestral parts, or simply the treble and bass clefs. Players are able to select which tracks or combination of tracks are to be included in the game, again this will affect the score as to what percentage of the total song these tracks include. The selection of songs, then number or choice of tracks, and then tempo are the principle ways that the player can determine the level of the game, and the focus of the repetition. This is further taught in U.S. Patent Application No. 2004/0137984, which is incorporated by reference herein.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, any computers discussed herein may include an operating system (e.g., Windows NT, 95/98/2000, Vista, OS2, UNIX, Linux, Solaris, MacOS, etc.) as well as various conventional support software and drivers typically associated with computers. The computers may be in a home or business environment with access to a network. An embodiment of the invention may operate on a game console, such as those produced by Nintendo, Microsoft, and/or Sony. In an exemplary embodiment, access is through the Internet through a commercially-available web-browser software package.

As set forth in the specification, the system and method of the invention may facilitate the providing information to participants through multiple media sources and may allow one or more modules to receive information via similar multiple media sources. The multiple media sources may include, for example, chat room, radio, bulletin board, internet web pages, email, billboards, newsletters, commercials and/or the like. The present invention may be described herein in terms of functional block components, screen shots, optional selections and various processing steps. It should be appreciated that such functional blocks may be realized by any number of hardware and/or software components configured to perform the specified functions.

For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, C-Sharp, AJAX, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like.

Additionally, many of the functional units and/or modules herein are described as being "in communication" with other functional units and/or modules. Being "in communication"

refers to any manner and/or way in which functional units and/or modules, such as but not limited to, computers, laptop computers, PDAs, modules, and other types of hardware and/or software, may be in communication with each other. Some non-limiting examples include communicating, sending, and/or receiving data and/or metadata via: a network, a wireless network, software, instructions, circuitry, phone lines, internet lines, carrier signals, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Music generally includes a plurality of musical events, usually notes, arranged according to a predetermined timing and often including other characteristics such as pitch, attack, duration, etc. These musical events may be stored as data, wherein each event may be accompanied by metadata describing one or more characteristics of the event. Further, musical events may be embodied in musical notation, such as but not limited to standard musical notation; wherein events and their characteristics may be graphically displayed as notes on a page. The notes, the score, key notation, and other visual indicators provide information about these events.

FIG. 1 illustrates an embodiment of a system for instructing and performing music on a stringed instrument. There is shown a user 41 playing an input instrument 43 that is in communication with a control module 45 that is in communication with a display module 47 showing musical information 49. The user inputs performance data through the input instrument in response to musical information displayed on the display module.

In the illustrated embodiment, the input instrument is a guitar shaped user interface having a MIDI output for transmitting MIDI information associated with input from the user through pressing buttons associated with fret positions of a fingerboard and strumming "strings" of the instrument. Examples of similar instruments include: those described in U.S. Pat. No. 5,471,009—Oba et al.—Sound Constituting Apparatus; U.S. Pat. No. 5,140,887—Chapman—Stringless Fingerboard Synthesizer Controller; U.S. Pat. No. 5,834,671—Phoenix—Wireless System for Switching Guitar Pickups; U.S. Pat. No. 5,033,353—Fala et al.—Improve Note Sensing in M.I.D.I. Guitars and the Like; U.S. Pat. No. Re. 31,019—Evangelista—Stringless Electronic Musical Instrument; U.S. Pat. No. 4,570,521—Fox—Electronic Musical Instrument with String-Stimulating Switches; and U.S. Pat. No. 6,018,119—Mladek—Stringless Twitch Fret Instrument, which are incorporated herein for their supporting teachings.

In the illustrated embodiment, the control module may be a computer, console, or other device or system including instructions for providing musical information to be displayed and for receiving and processing performance information/data from the input instrument.

The illustrated display module/device is a television or monitor, such as but not limited to a CRT or LCD monitor. It is understood that one skilled in the art would recognize that such display devices are plethoric and commonly used.

The illustrated musical information (graphical display) shows a plurality of game objects scrolling upwards to a target area indicating notes to play on the input instrument and timing for such play.

As illustrated, a user may learn, practice, and/or play an input instrument, such as but not limited to, a guitar, violin, etc. while viewing the musical information through a display module. A control module may function to adapt and/or connect the input instrument to the musical information the display module. In combination with the above, the system provides an interactive instrument and display. The graphical interface may mirror and/or be similar to the input instrument; thereby enabling a user to view the graphic interface and learn correct note positions, pitches, etc. on his or her input instrument.

Figure 2:
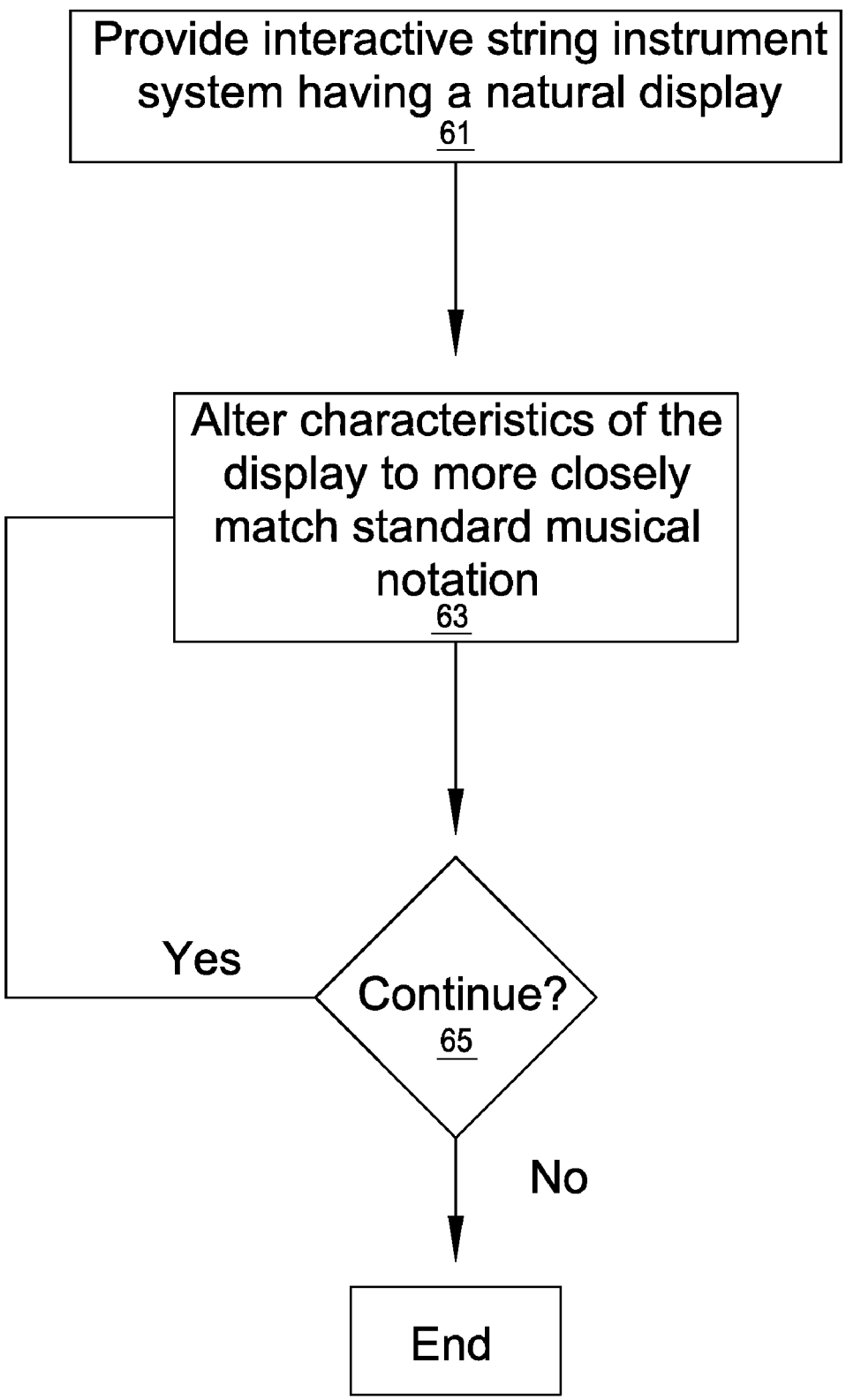
FIG. 2 is a flowchart illustrating a method for instructing and displaying musical notation for a stringed instrument, according to one embodiment of the invention.

FIG. 2 illustrates a method of instructing performance of a stringed instrument and instructing musical notation. In particular, a user is provided 61 with an interactive stringed instrument game having a natural interface/display. A characteristic of the interface/display is altered 63 to more closely match standard musical notation. This alteration process may continue 65 in steps as desired up to and including wherein the interface/display matches standard musical notation.

The provided system (such as but not limited to the system of FIG. 1) includes a natural interface, including an input instrument and a display showing musical information in a mode relating to the mode of operation of the instrument more closely than standard musical notation. In the case of stringed instruments, this may be accomplished by providing musical information in a format that matches physical behavior required to perform displayed musical information. Typically this will include providing an image associated with one or more strings or a fretboard/fingerboard and providing indications as to when, where, and how to manipulate the instrument for a desired musical performance. Accordingly, while the musical information may substantially vary from standard musical notation, the user may more easily and intuitively perform according to the musical information displayed. Such a system may include a scoring system or other mode of providing feedback to a user to assist in evaluating performance, providing motivation, or otherwise enhancing the experience.

Figure 3:
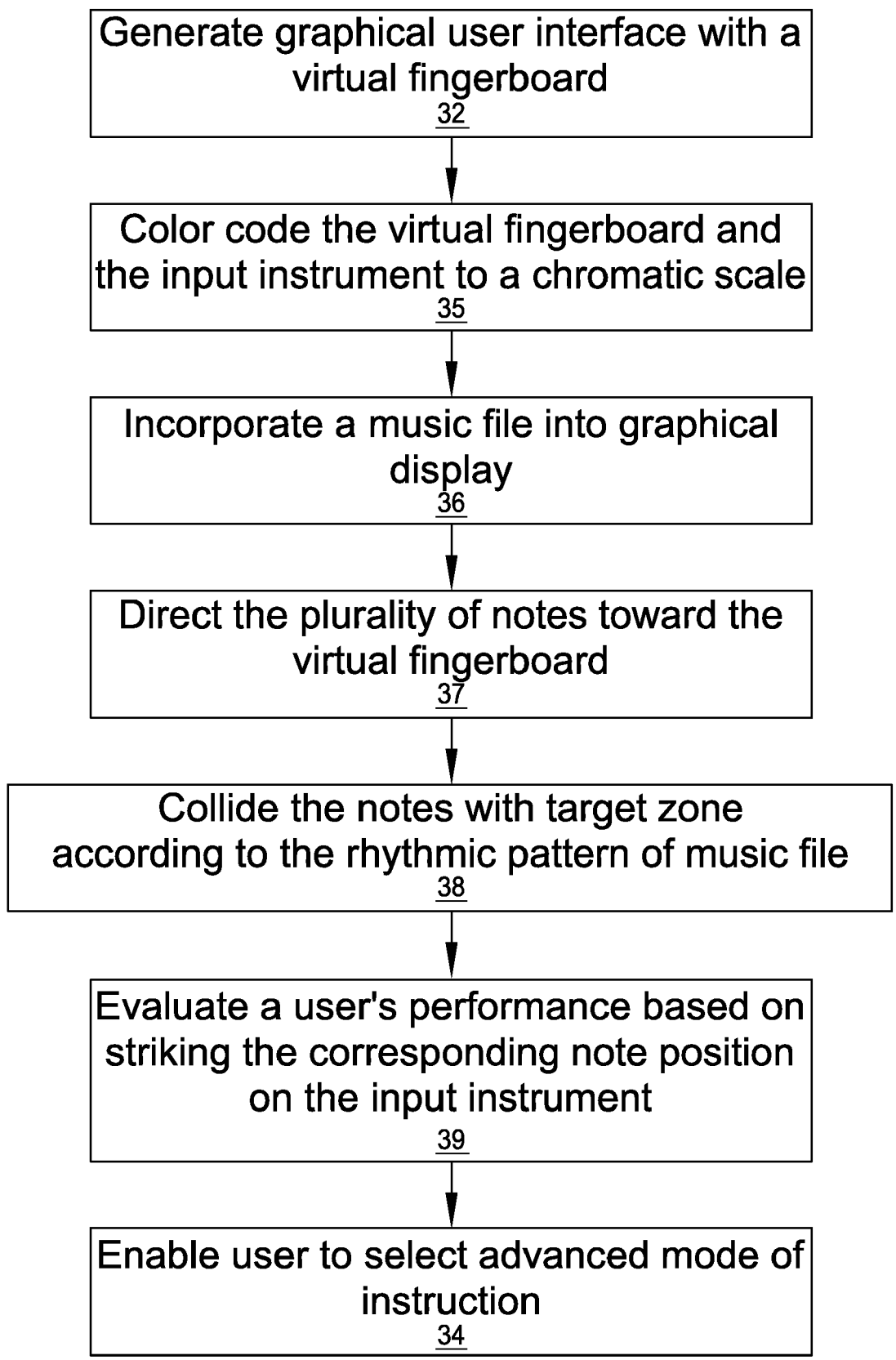
FIG. 3 is a flowchart illustrating a method for instructing and displaying musical notation for a stringed instrument, according to one embodiment of the invention.

FIG. 3 illustrates a more detailed example of a method of instructing performance and notation according to one embodiment of the invention. In particular, the illustrated method includes generating 32 a graphical user interface, color coding 35 a virtual fingerboard and an input instrument, incorporating 36 musical information (e.g. a music file) into a display (graphical user interface), directing 37 a plurality of notes towards the virtual fingerboard, colliding 38 the notes with a target area, such as but not limited to the virtual fingerboard, according to a rhythmic pattern, evaluating 39 a user's performance (timing, note selection, or other measurement of performance), and enabling 34 a user to select a more advanced mode of instruction.

The illustrated method includes incorporating a music file in the graphical user interface, wherein the music file contains data corresponding to an arrangement of a plurality of musical notes in sequence, having a rhythmic pattern, and represented by at least one game object. The music file may be embodied in music data and/or music metadata and may contain data corresponding to an arrangement of a plurality of musical notes in sequence. The music file and/or game objects may represent, embody, and/or be associated with any type and/or kind of music performance data, prerecorded music data, and/or any music data contemplated in the art, or described herein. Additionally, the game objects may take any form and/or shape as contemplated in the art, or as described herein.

Additionally, as shown throughout the figures, the method may include directing the game objects in a substantially vertically and substantially straight trajectory toward a note position disposed on the virtual fingerboard. In being substantially vertical and substantially straight, the trajectory may or may not be exactly straight and/or vertical direction, but may veer slightly to the right and/or left. Additionally, the trajectory of the game objects may include patterns and/or designed trajectories comprising a variety of angles and/or trajectories configured to challenge and/or entertain one more users and/or player modules.

Figure 4:
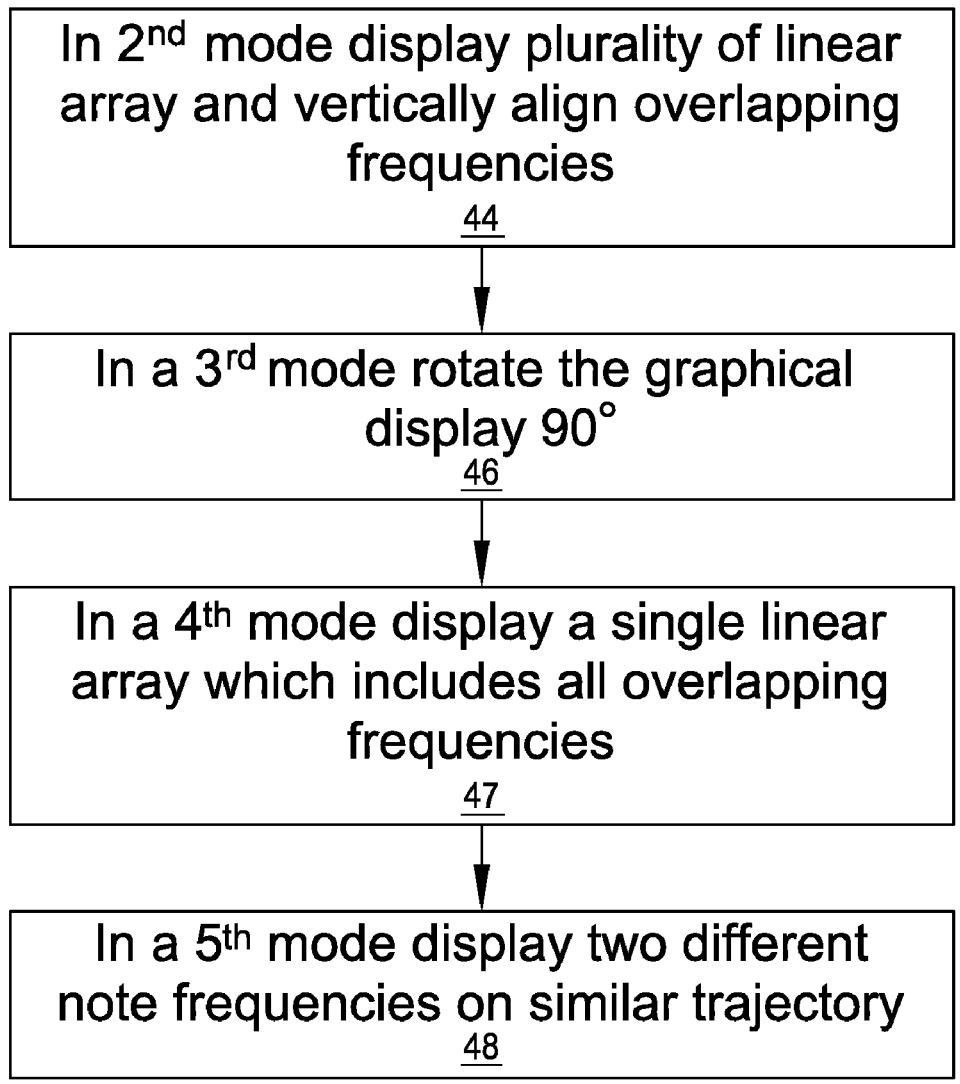
FIG. 4 is a flowchart illustrating the modes of instruction according to a method for instructing and displaying musical notation for a stringed instrument, according to one embodiment of the invention.

FIG. 4 illustrates an exemplary progression of advanced modes. In particular, there is an implied first mode corresponding with a first display having a set of characteristics providing an intuitively instructional display. Further, there are a series of modes that include incremental changes to a graphical display that enable a student/performer to learn to progress from an intuitive instruction method to standard musical notation.

In one non-limiting example, the first mode includes a graphical display of a virtual fingerboard including an array of virtual strings forming a grid of notes displayed to replicate a view of a guitar player looking at a fingerboard of his or her own instrument during play. Further, game objects corresponding to notes are directed vertically (upward or downward) towards the virtual fingerboard and towards a target area, thereby indicating timing of when to play notes. One or more visual cues associated with game objects provide information needed to know which note to play. These cues may be color coding, shape coding, tag lines, and etc.

There is a second mode 44 wherein the virtual strings are shifted from a rectangular grid to a stair-step pattern wherein substantially equal frequencies are vertically aligned. This step is closer to standard musical notation as game objects corresponding to different frequencies travel along less redundant paths.

In the illustrated third mode 46, the graphical user interface is rotated by ninety degrees. Accordingly, game objects then travel along a substantially horizontal trajectory. This trajectory is more similar to the read trajectory of notes in standard notation. As notes in standard notation are generally read left to right, the read trajectory or relative trajectory of the notes is from right to left. Accordingly, it is advantageous to rotate the graphical display in a direction that causes the notes to travel from right to left. In particular, wherein the virtual fingerboard was positioned at a top of the screen, rotation is counter-clockwise. Wherein the virtual fingerboard was positioned at a bottom of a screen (such as may be useful in a display mode for a left-handed guitar), rotation may be clockwise.

In the illustrated fourth mode 47, a single virtual string is displayed representing the chromatic scale. This may be effectuated by replacing or by augmenting the stair-stepped array of virtual strings. This single virtual string provides a location of focus whereby the user may more easily correlate note trajectories to positions on a musical staff.

In the illustrated fifth mode 48, notes having a shared position on a standard musical staff are positioned and directed such that they share a trajectory. There may be associated cues for distinguishing between such notes, such as but not limited to color coding, shape coding, sharp/flat notation, and etc. Accordingly, the user may be taught to read and/or recognize this feature of standard musical notation.

Accordingly, one or more characteristics of the graphical interface may be progressively altered until the graphical interface matches and/or closely resembles standard musical notation. Advantageously, in this manner, the illustrated system, apparatus, program code, and method provide a fun, methodical, step-by-step process of instruction and learning. Visual examples of modes similar to those already described follow.

Figure 5:
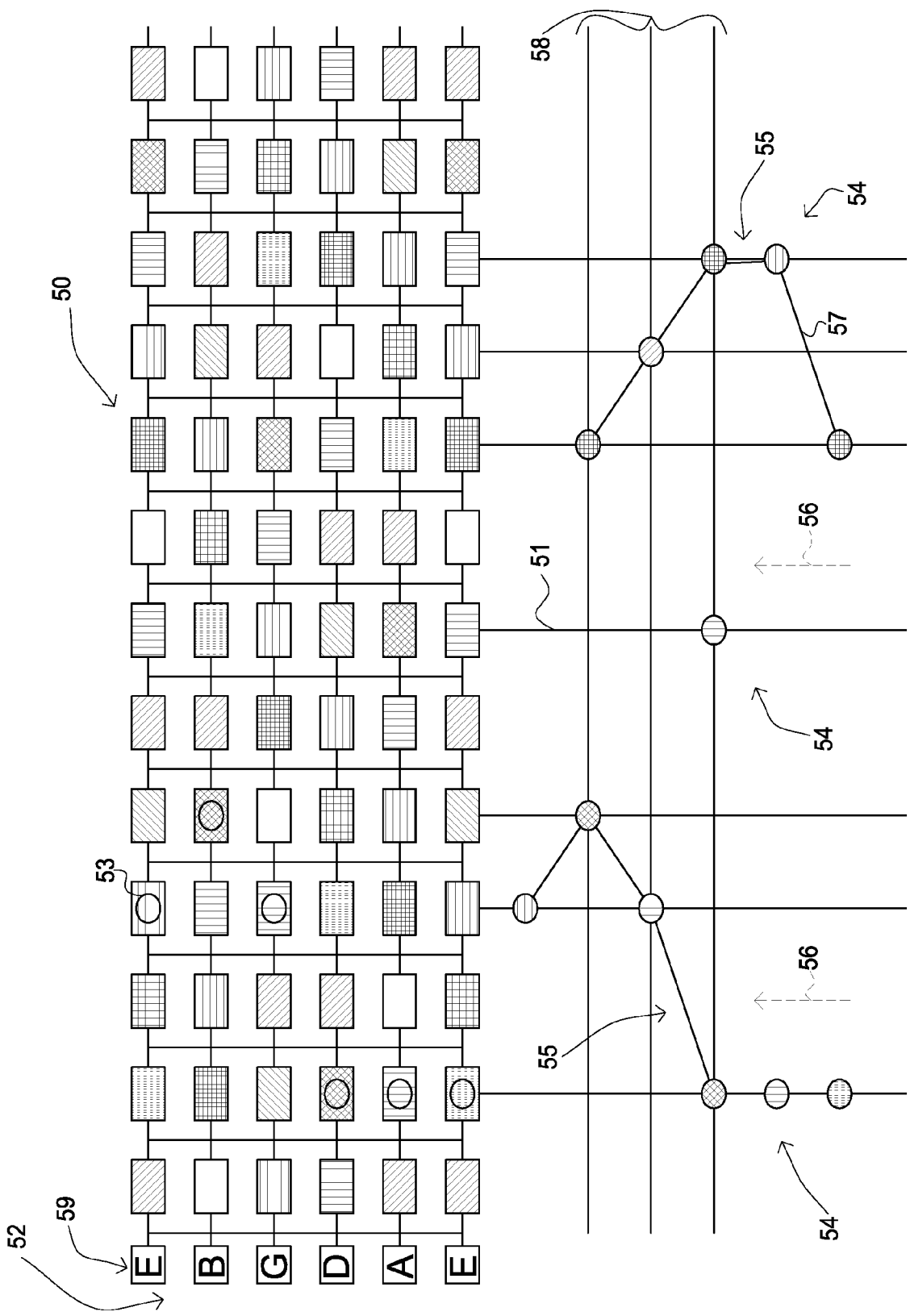
FIG. 5 illustrates a graphical display, according to one embodiment of the invention.

FIG. 5 illustrates a graphical display according to one embodiment of the invention. In particular, there is shown a color coded fingerboard grid 50 including a plurality of virtual strings 52 labeled (from top to bottom) E, B, G, D, A, and E. There are also game objects 54 (notes) positioned on a lower portion of the screen and progressing 56 vertically towards the virtual fingerboard and towards a target zone 58. There are tag lines 51 showing a trajectory of an associated note. Further, there are additional visual cues 53 associating game objects with finger positions on the fingerboard.

The virtual strings include color coded fret positions arranged in a rectangular array having note positions in columns and rows. The illustrated fingerboard is configured to imitate a user view of a played guitar. In particular, the high E string is positioned at the top-most portion of the grid with higher frequency notes positioned towards the right-most portion of the grid. Accordingly, a user may intuitively associate finger positions with images displayed on the graphical display. The illustrated color coding matches a twelve note chromatic key. Accordingly, note patterns along virtual strings and between virtual strings are visually apparent. In particular, it is more easily understood how and where adjacent strings have note frequency overlap. Further, octave relationships between fingerboard positions are also more easily understood. These benefit the user by making the interface more intuitive and natural.

As illustrated throughout the figures, the method for instructing a user to read musical notation includes coding the virtual fingerboard, the coding being indexed to a chromatic scale. The coding may be any kind and/or type of color scheme contemplated in the art. In a non-limiting example, each note, pitch, and/or frequency of a chromatic scale is assigned and/or marked with the particular color, such as but not limited to, white for the C pitch/note, light blue for the D pitch/note, orange for the E pitch/note, etc. Octaves above and/or below are assigned and/or marked in a similar fashion. The note positions on the virtual fingerboard and input instrument, representative of music notes/pitches, as previously described, include the colors and/or markings associated with the note position particular note and/or pitch. Advantageously, the note positions on the virtual fingerboard and the fingerboard positions on the input instrument are similar, thus enabling a user to more easily see the note positions and play the corresponding fingerboard positions on the input instrument.

The illustrated game objects are color coded to match intended finger positions on the fingerboard. Further, wherein a plurality of notes is to be played simultaneously, they may be displayed as a note group 55. A note group may include an indicator 57, such as but not limited to lines, halos, balloons, and etc., connected notes of a note group. In one example, a note group is to be played upon the first note of the note group to cross into a target area.

As shown through out the figures the virtual fingerboard includes a plurality of note positions, each note position having a corresponding fingerboard position on the input instrument. The plurality of note positions each represent a frequency and/or pitch associated with and/or representing the corresponding fingerboard position on the input instrument. The plurality of note positions may include one or more open string position indicators 59. The open string positions indicators may function to demonstrate to a user the presence of an open string note and/or game object.

Additionally, as shown through the figures, the virtual fingerboard may include vertical lines disposed between the note positions. The vertical lines may represent frets and/or the image of a fretboard which are commonly found in a variety of instruments. In a non-limiting example, the plurality of linear arrays and note positions form a grid.

In the illustrated embodiment of FIG. 5, the method includes displaying the graphical interface, such that the string selection and timing of play are simultaneously represented on the vertical axis. The timing of play may be the tempo and/or rhythm with which the game objects are directed and/or move vertically toward the virtual fingerboard. Indeed, in an additional embodiment, the timing of play selection may be adjusted and/or regulated by a user; thus enabling him or her to speed the movement of the game objects.

In yet another embodiment, the method may include modifying and/or adjusting the string tuning (color coding or other modes of indicating note frequency) and/or virtual fingerboard configuration to select between fingerboards of a variety of stringed instruments such as but not limited to, guitars, violins, cellos, banjos, sitars, etc.; to represent a different tuning configuration (Hawaiian, Jazz, etc.); left-handed vs. right handed instruments; and/or other characteristics of play of a stringed instrument.

The illustrated target area may function to visually enhance and/or indicate to a user the proper timing of the music file being played. In a non-limiting example, when the game object enters the target area a user strikes and/or plays the appropriate or corresponding note, chord, and/or fingerboard position on his or her input instrument. The target area may comprise any graphics, video and/or audio signal contemplated in the art such that a user is alerted to proper timing of the note. As illustrated, in a non-limiting example, the target area comprises a plurality of horizontal lines vertically adjacent to the virtual fingerboard. In the illustrated example, the top line of the target area represents a position of exiting the target area, the bottom represents entering, and the middle represents an ideal play moment. As the game objects, notes, and/or chords enter the target area, a user is alerted of the need to play the illustrated notes/chords on his or her input instrument. One skilled in the art would realize the target area may be disposed, located at, and/or comprise a plurality of graphics, video and/or audio signal contemplated in the art such that a user is alerted to proper timing of the game objects or notes.

In an additional embodiment as illustrated in FIG. 5, the target area may comprise virtual fingerboard markers 53 disposed on the virtual fingerboard. The virtual fingerboard markers may function to visually illustrate to user the proper fingerboard positions of the approaching notes, chords, and/or game objects. The virtual fingerboard markers may visually illustrate the proper fingerboard positions in any manner contemplated in the art, such as but not limited to, highlighting, contrasting and/or brightening the colors, flashing or blinking, marking with an x and/or circle, and/or so forth.

In an alternative embodiment, the target area may be disposed and/or superimposed over the virtual fingerboard. Indeed, in a non-limiting example, as the notes, chords, and/or game objects approach the virtual fingerboard, the virtual fingerboard markers will illustrate and a user will then play the notes as one or more of the notes, chords, and/or game objects enter the target area and are superimposed over their corresponding note positions on the virtual fingerboard.

The method for instructing a user to read musical notation, as illustrated throughout the figures, may additionally include colliding the game objects with note positions that correspond with the representative frequency and/or pitch of the game objects. Additionally, the method may include introducing a series of visible staff lines, wherein the visible staff lines correspond to the substantially vertical and substantially trajectories of the game objects. In one non-limiting example, a game object travels vertically along a visible staff line toward the virtual fingerboard until the game object collides with the corresponding note position.

Figure 6:
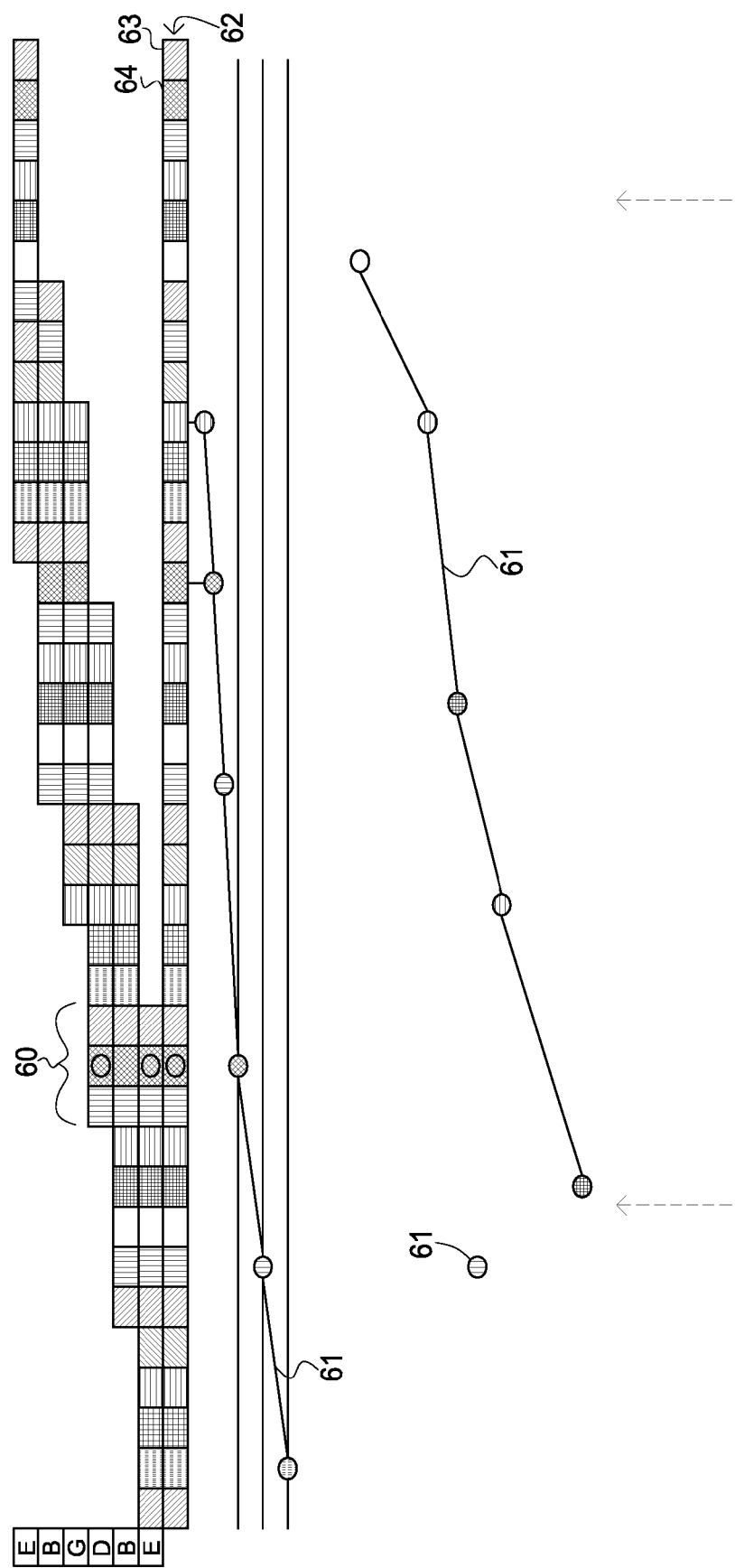
FIG. 6 illustrates a graphical display, according to one embodiment of the invention.

FIG. 6 illustrates an exploded or stair-step view, wherein a display similar to that of FIG. 5 has been altered to vertically align frequency ranges of adjacent strings. This also changes the positions and trajectories of game objects 61 as associated fingerboard positions are moved horizontally to the side.

In the illustrated example, the six virtual strings represent standard tuning of a guitar. Accordingly, there is substantial overlap in frequency ranges of the adjacent strings and some overlap between some next adjacent strings. In particular, the low E string overlaps in at least three notes with the low B string and the D string at frequency positions 60.

There is shown a note position indicator bar 62. The note position indicator bar may be disposed horizontally and adjacent or near to the target area and/or the virtual fingerboard. The note position indicator bar may include a plurality of note position indicators 63, each note position indicator being coded according to the particular note position represented by the note position indicator. Advantageously, the note position indicator bar may provide a user with a quick reference to the proper note position which he or she is required to strike and/or play.

Figure 7:
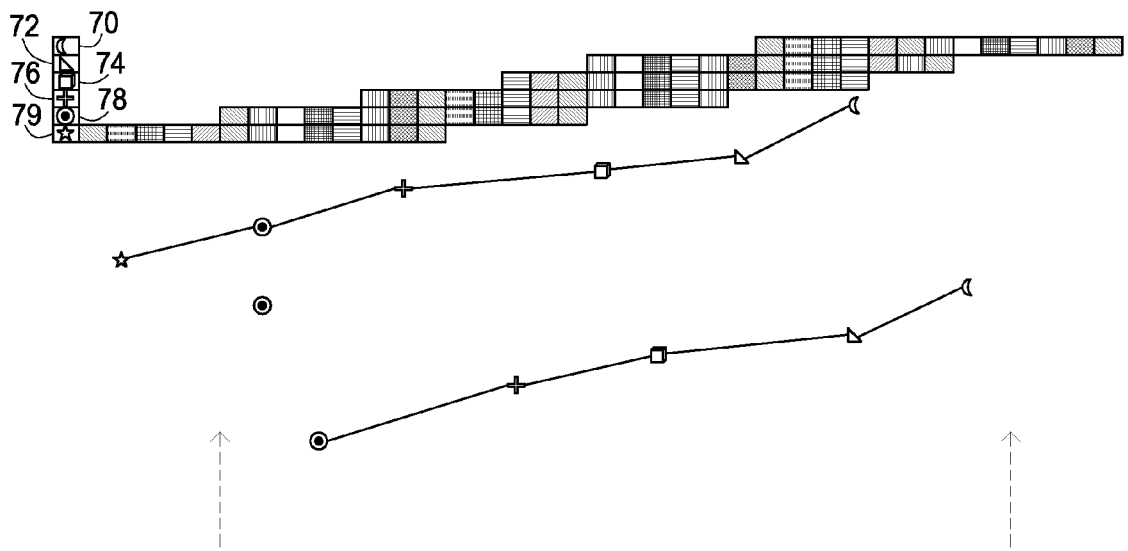
FIG. 7 illustrates a graphical display, according to one embodiment of the invention.

FIG. 7 illustrates game objects having predefined shapes associated with intended string usage. Stringed instruments having overlapping frequency ranges among different strings present an ability to play some notes on a plurality of strings. Accordingly, in an exploded view, there may be a desire to indicate to a user which string is recommended to be used in generating an indicated note. Accordingly, there may be shapes or other cues assigned to particular strings. In the illustrated example, strings are assigned the shapes/icons/symbols of moon 70, triangle 72, cube 74, cross 76, target 78, and star 79. The icons/symbols may comprise any graphical and/or illustrative, audio/video image contemplated in the art. Additionally, the icons/symbols may be disposed and/or oriented in fashion, location and/or manner on the musical information as contemplated in the art. Additionally, as illustrated the notes and/or game objects may be represented by the various icons/symbols in accordance with the note and/or game object's particular string/linear array. Advantageously, as the notes and/or game objects, visualized by the icons/ symbols, advance toward the virtual fingerboard a user may quickly be able to recognize which string and/or note position to play.

In an additional embodiment, the game objects comprise musical notes and/or fingerboard position which correspond to a musical notes and/or fingerboard positions to be played on the input instrument. The method may include awarding a value to one or more users and/or player modules based upon the users striking a corresponding fingerboard position on the input instrument approximately simultaneously as the game object collides with the note position and/or target area on or adjacent to the virtual fingerboard. In being "approximately simultaneous", one or more users may or may not strike a corresponding position on his or her input instrument at the exact moment a game object collides with a note position. An award value may be awarded to one or more users and/or player modules if the users strike a corresponding position his or her input instrument one or two seconds before and/or after the exact moment a game object collides with the target area and/or note position on the virtual fingerboard.

In an additional embodiment, the meaning of "approximately simultaneous" may be changed and/or set by one or more users. The method may include varying the degrees of difficulty which may or may not be changed by one or more users. In one non-limiting example, a degree of difficulty may include expert; wherein "approximately simultaneous" means the exact moment a game object and collides with collides with a note position. In another non-limiting example, a degree of difficulty may include beginner; wherein "approximately simultaneous" means two seconds before and/or after a game object collides with a collides with a note position.

Figure 8:
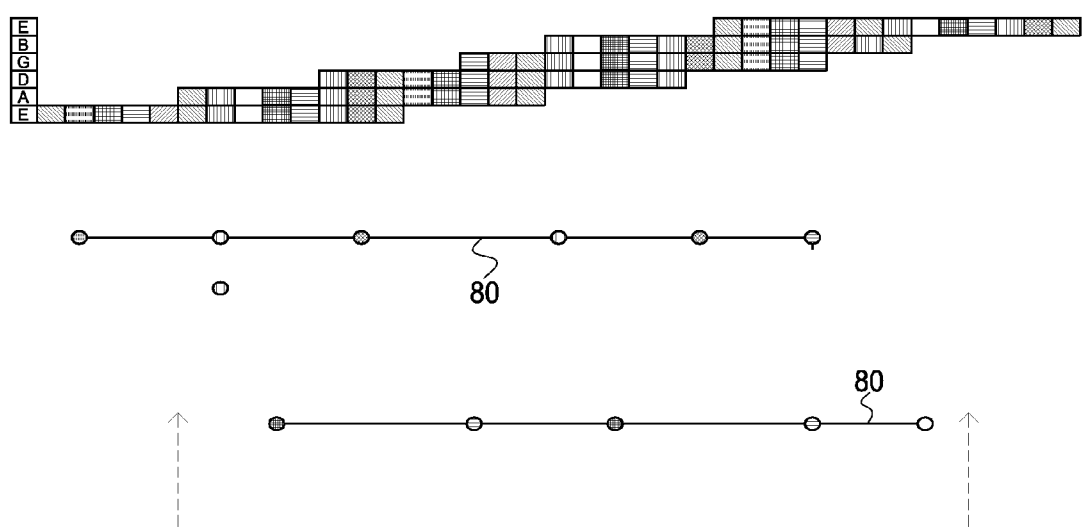
FIG. 8 illustrates a graphical display, according to one embodiment of the invention.

FIG. 8 illustrates a mode wherein note groups are vertically collapsed. A mode having vertically collapsed note groups 80 more closely relates to standard musical notation wherein simultaneously played notes are generally aligned in an array orthogonal to the direction of reading. It is expected that such a mode generally follows or accompanies an exploded mode when a graphical display is a 2-dimensional view. Wherein a graphical display shows a 3-dimensional view (for example, notes traveling through a 3-d space towards a wall having a color coded surface), it is easier to show simultaneous notes as being aligned. In a 3-dimensional view, alignment may be shown simultaneously with a fingering shape associated with a particular chord type.

In another embodiment, the method for instructing a user to read musical notation includes displaying the musical information and features, components, and/or functions thereof three-dimensionally. In one non-limiting example, the graphical user interfaces illustrated in FIGS. 5 through 11 may be illustrated in 3-D. Displaying the musical information in three-dimensions may be accomplished and/or include any graphics and/or illustrations contemplated in the art or as taught in U.S. Pat. No. 7,095,408 issued to Lu et al.; U.S. Pat. No. 6,898,302 issued to Brummer; and U.S. Pat. No. 6,570,575 issued to Wittenbrink; which patents are incorporated by reference herein.

Figure 9:
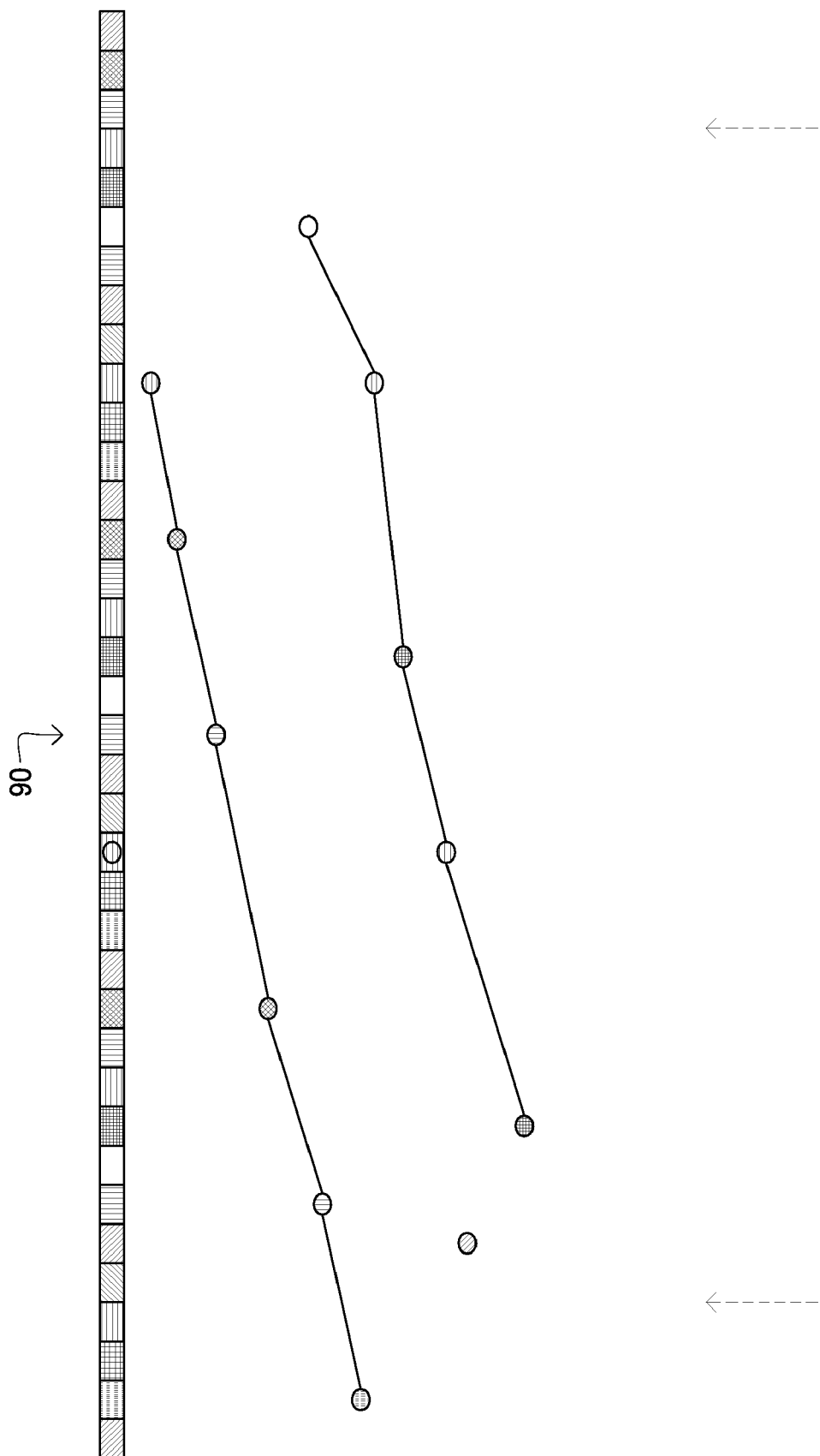
FIG. 9 illustrates a graphical display, according to one embodiment of the invention.

FIG. 9 shows an example wherein virtual strings are removed and a note position indicator bar 90 functions as a note indicator (and virtual fretboard in this case) and a target area. Further, the entire graphical display is rotated ninety degrees counter-clockwise. Accordingly, the game objects representing notes travel right to left towards the target area. The modified virtual fingerboard is positioned substantially on a left side of the display; the notes and/or game objects continue to move along the substantially straight trajectory toward the virtual fingerboard in a horizontal rather than vertical trajectory. In this mode, the displayed musical information is increasingly similar to standard musical notation, as the notes and/or game objects are oriented in a horizontal manner similar to standard musical notation.

Figure 10:
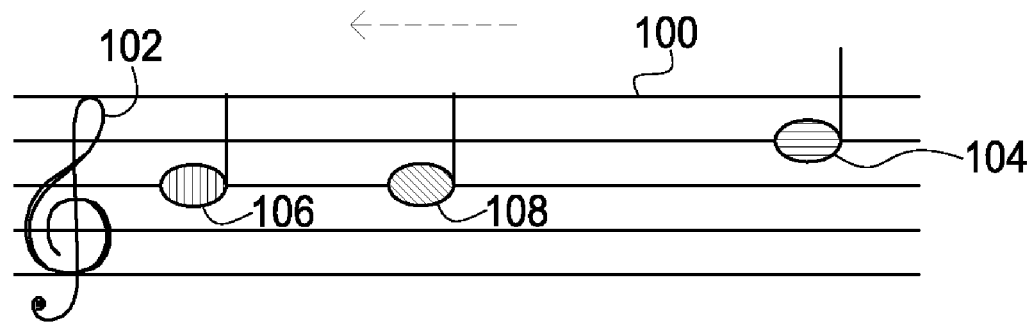
FIG. 10 illustrates a graphical display, according to one embodiment of the invention.
Figure 11:
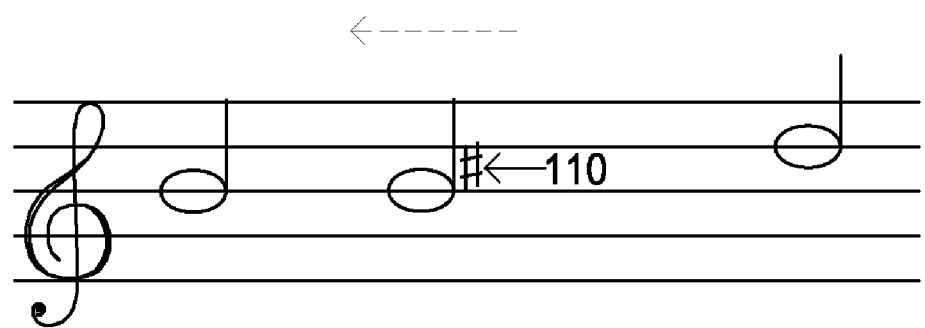
FIG. 11 illustrates a graphical display, according to one embodiment of the invention.

FIG. 10 illustrates a display including staff lines 100 and a treble clef 102. Further, game objects 104 are illustrated in the shape of standard notes having color coding associated with notes to be played. While there is no note indicator or virtual fingerboard displayed, it is envisioned that an embodiment may include one or more of such. Of particular note, notes 106 and 108 occupy that same horizontal track but have different color coding. This reflects a characteristic of standard musical notation wherein sharps and flats of a particular key may be expressed as notes at the same position as the base note. Accordingly, wherein there may be a correspondence different from this in a previous mode, this mode may more closely mimic standard musical notation. As a user becomes familiar with each mode and then progresses, the user may develop and intuitive understanding of musical notation instead of being required to learn it through abstraction and difficult practice. As with all modes, this mode may include any and/or all of the features, embodiments, functions, etc. of other modes.

In one example, this mode may comprise displaying the third linear array wherein at least two different note frequencies are displayed along a substantially similar trajectory. There may be a standard music staff and the notes and/or game objects may be displayed on the musical staff according to standard musical notation. In displaying two different frequencies along a substantially similar trajectory, notes and/or game objects such as B and $B^b$, while containing a different frequency and/or pitch, are disposed and/or displayed along a similar trajectory, i.e., the B note position on the musical staff.

According to one non-limiting exemplary embodiment, two adjacent but different frequencies need not be displayed on exactly the same trajectory, but rather the trajectories of the half step frequencies may vary slightly according to a chromatic scale. Such an example includes, but is not limited to, $B^b$ and B. Wherein the $B^b$ trajectory may be slightly lower than the B trajectory. Notes and/or game objects of this example retain color coding, thereby still assisting a user as necessary. Color coding is removed in FIG. 11 and standard musical notation cues 110 are provided as a final step in instructing a user to read musical notation.

Figure 12:
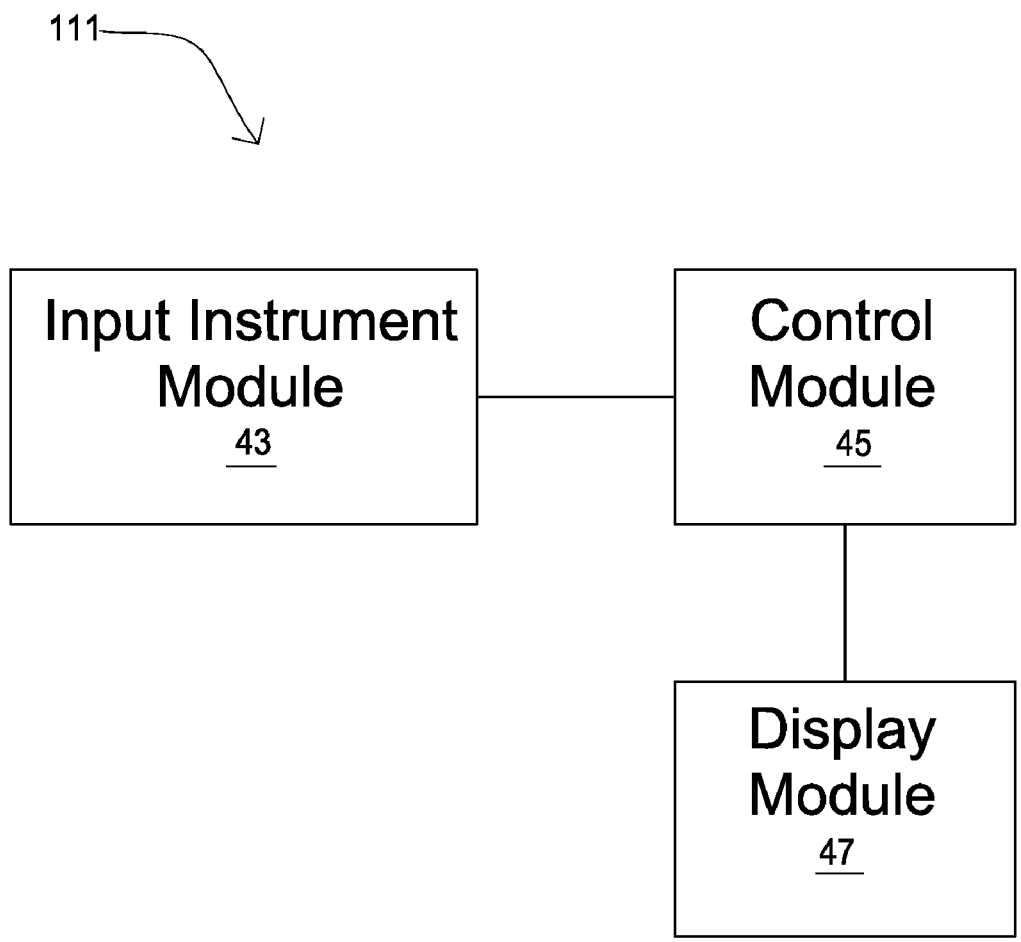
FIG. 12 is a block diagram of a system for instructing and displaying musical notation for a stringed instrument, according to one embodiment of the invention.

As illustrated in FIG. 12 there is a system for instructing a user to read musical notation through interaction with a musical information graphical display and an input instrument representative of a stringed instrument. The system may comprise: a display module configured to display data; an input instrument module representative of a stringed instrument and in communication with the display module; a control module in communication with the display module, and comprising instructions for directing the display module; and a graphical user interface module. The display module may be any type and/or kind of display module contemplated in the art, or as described herein. Some non-limiting examples of display modules include: computer monitor and/or display, TV and/or projector displays, portable display monitors, PDA, laptop monitors, tablets, and/or so forth.

Figure 13:
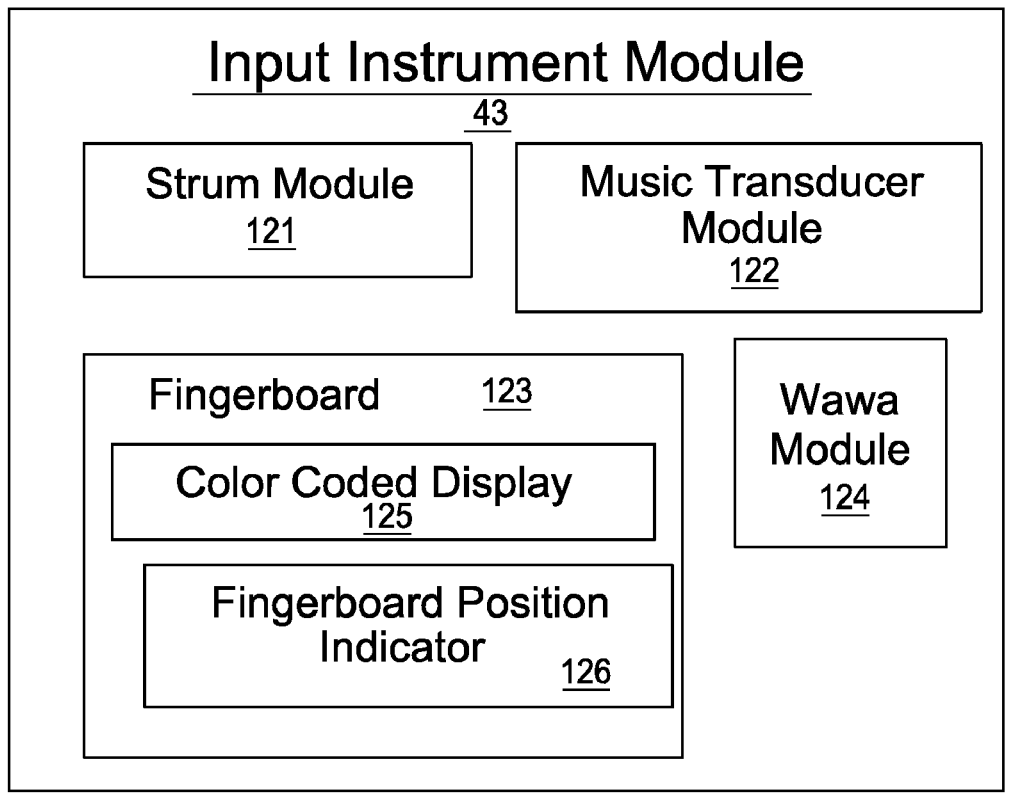
FIG. 13 is a block diagram of a system for instructing and displaying musical notation for a stringed instrument, according to one embodiment of the invention.

FIG. 13 illustrated a block diagram of an exemplary instrument module. The illustrated input instrument module 43 includes: a strum module 121, a music transducer module 122, a fingerboard 123, and a WaWa module 124. The strum module may be any type and/or kind of strum module contemplated in the art. In a non-limiting example, the strum module may comprise string-like members coupled to the input instrument module and may include and/or be incorporated into the music transducer module. The strum module may be configured such that when a user strikes and/or plays one or more of the string-like members a signal is communicated to the input instrument module and/or music transducer module. In another non-limiting example, the strum module may be configured to represent the strum portion and/or strings of a stringed instrument.

As shown in Figure, the input instrument module also may include a transducer module. The transducer module may be any type and/or kind of transducer module contemplated in the art. In one non-limiting example, the transducer includes a transducer for a stringed instrument, such as those taught in U.S. Pat. Nos. 6,271,456 and 4,527,456 which are incorporated herein by reference. Additionally, a variety of types and/or kinds of transducers, including Piezo transducers, may be available through MKS instruments of San Jose, Calif.

Also shown throughout the figures, the input instrument module includes a fingerboard. The fingerboard may be any type of fingerboard and/or include any components and modules as contemplated in the art, or as described herein. In a non-limiting example, the fingerboard includes a coded display 125 and a fingerboard position indicator 126 disposed along the top portion of the fingerboard. Indeed, as previously described, the fingerboard may be coded in any manner to imitate the musical information and/or note positions. Additionally, the top portion of the fingerboard may be coded and/or include markings that represent and/or provide reference to the fingerboard positions, as described herein.

Also, as illustrated throughout the figures, the input instrument module includes a WaWa module configured to alter performance information according to a pattern that may include input from a lever or other user interface. The Wawa module may be any type and/or kind of Wawa module contemplated in the art. It is understood that analog and digital signal modifiers are plethoric and well known in the art.

Figure 14:
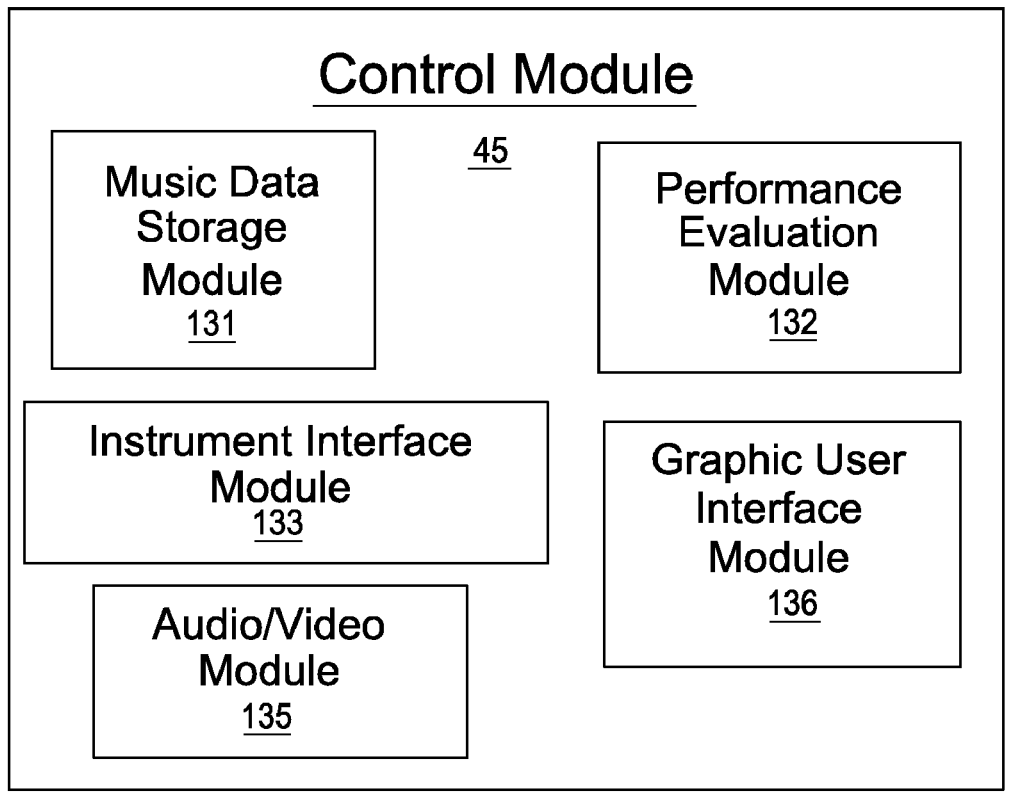
FIG. 14 is a block diagram of a system for instructing and displaying musical notation for a stringed instrument, according to one embodiment of the invention.

FIG. 14 shows a block diagram of an exemplary control module. The control module 45 may be in communication with the display module and/or the input instrument module. The control module may include instructions for directing the display module and/or the input instrument module. The control module may be apart from and/or embodied in and/or incorporated as part of either the input instrument module and/or the display module.

The illustrated control module may include: a music data storage module 131, an audio/video module 135, a graphical user interface module 136, an instrument interface module 133, and a performance evaluation module 132. The audio/video module may be any type and/or kind of audio/video module contemplated in the art and/or be configured to function as described herein. Examples include video cards and/or other video controllers known in the art to control. Instruct, and/or otherwise deliver video information usable by a display device.

In another embodiment, the control module includes a music data storage module. The music data control module may be any type and/or kind of music data storage module contemplated in the art. The music data storage module may include any hardware, software, or other data storage medium contemplated in the art. Some non-limiting examples include: cartridges, hard drives, flash memory, USB memory sticks, and/or so forth.

In one embodiment, the music data storage module includes an assigned channel or track and an unassigned channel or track. A channel may include a subset of a larger set of data. The assigned channel may comprise data associated with an assigned music part and/or a music part and/or series of notes and/or game objects, configured for the play and/or instruction of a user. The music data storage module may be configured to and include instructions for receiving and/or storing music data. The assigned channel may be embodied in the series of notes to be played. In another non-limiting example, the assigned channel may be displayed on the display module. In another non-limiting example, the assigned channel includes a series of notes to be played in a rhythmic pattern.

In another embodiment, the music data storage module includes an unassigned channel. The unassigned channel may comprise prerecorded and/or predetermined music data. Predetermined music and/or prerecorded music data may include a song and/or orchestral piece as performed by the original artist or as sung or played by professional musician, or as described herein. Additionally, the unassigned channel may be configured to and include instructions for receiving and/or storing all the music data not associated with a player module's assigned part of a musical composition. In one non-limiting example, the unassigned music channel includes music data in form of mp3, MIDI format, and/or other form that is embodied in the assigned channel.

In still another embodiment, the control module includes an evaluation module configured to evaluate the progress and/or performance of the user. The evaluation module may function and/or may include instructions for evaluating and/or monitoring the performance, progression, and/or instruction of one or more users and/or input instruments. Evaluating the performance, progression, and/or instruction may include: recording the performance; matching units of the performance channel to units of the assigned channel and/or assigned music data; incrementing one or more users' score if a positive match is determined, and signaling the score increment to the control module. In one embodiment, the performance channel includes performance data and/or values associated with a user's and his/her input instrument.

In yet another embodiment, the evaluation module may function and/or include instructions for communicating and/or displaying evaluation data associated with one or more users and/or input instruments. The evaluation data may be displayed in any manner or form contemplated in the art. In one non-limiting example, the evaluation data comprises one or more icons visually disposed on the graphical user interface. Additionally, the evaluation data may be any type and/or kind of evaluation data contemplated in the art.

Additionally, as shown throughout the figures, the system for instructing a user to read musical notation also may include a graphical user interface module. The graphical user interface module may comprise any type and/or kind of graphical user interface module contemplated in the art. Additionally, the graphical user interface module may include instructions for configuring, displaying, and creating the musical information and/or any other features, components, and/or functions as described herein.

Figure 15:
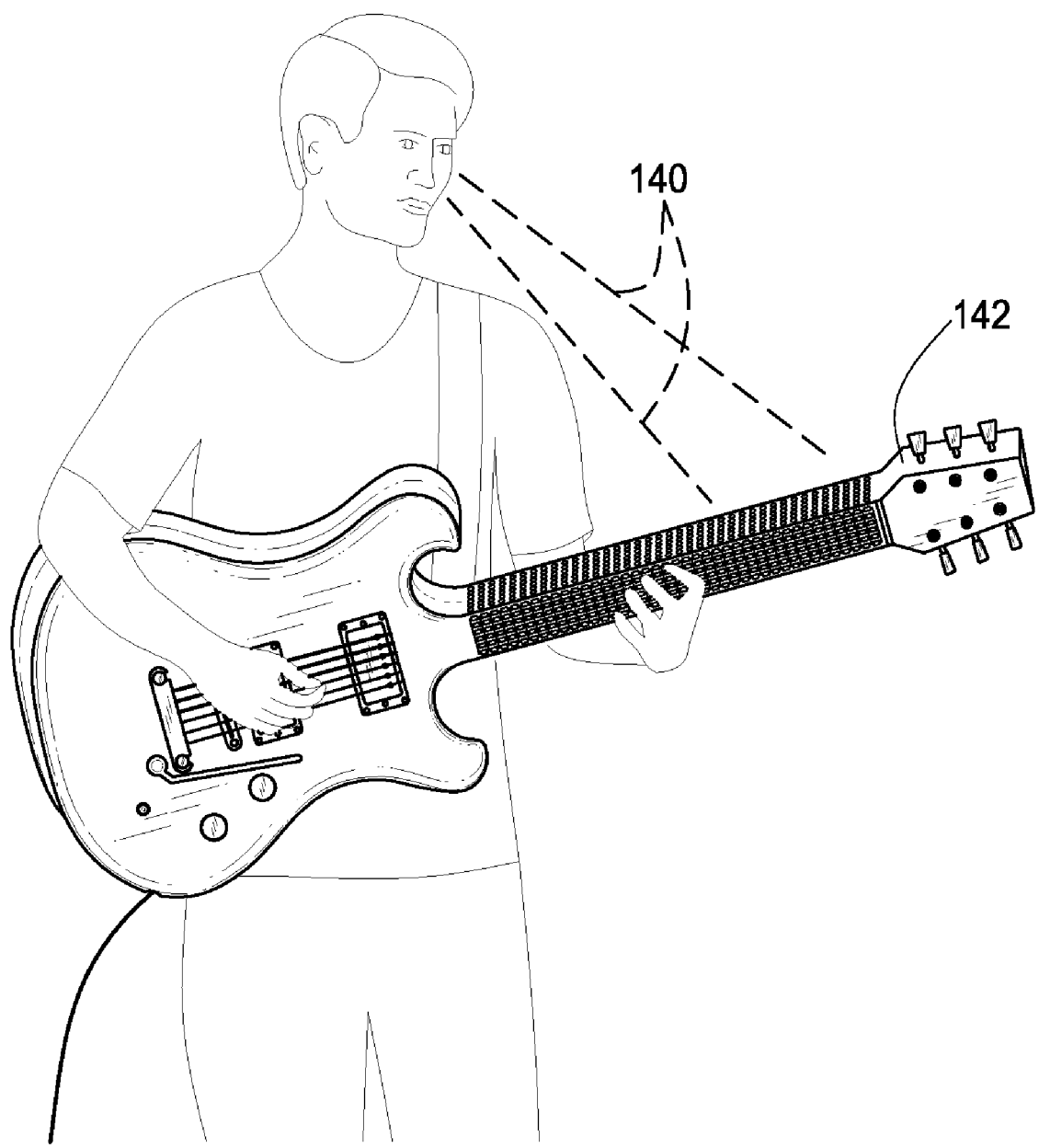
FIG. 15 is a perspective view of the operation of a system and apparatus for instructing and displaying musical notation for a stringed instrument, according to one embodiment of the invention.
Figure 16:
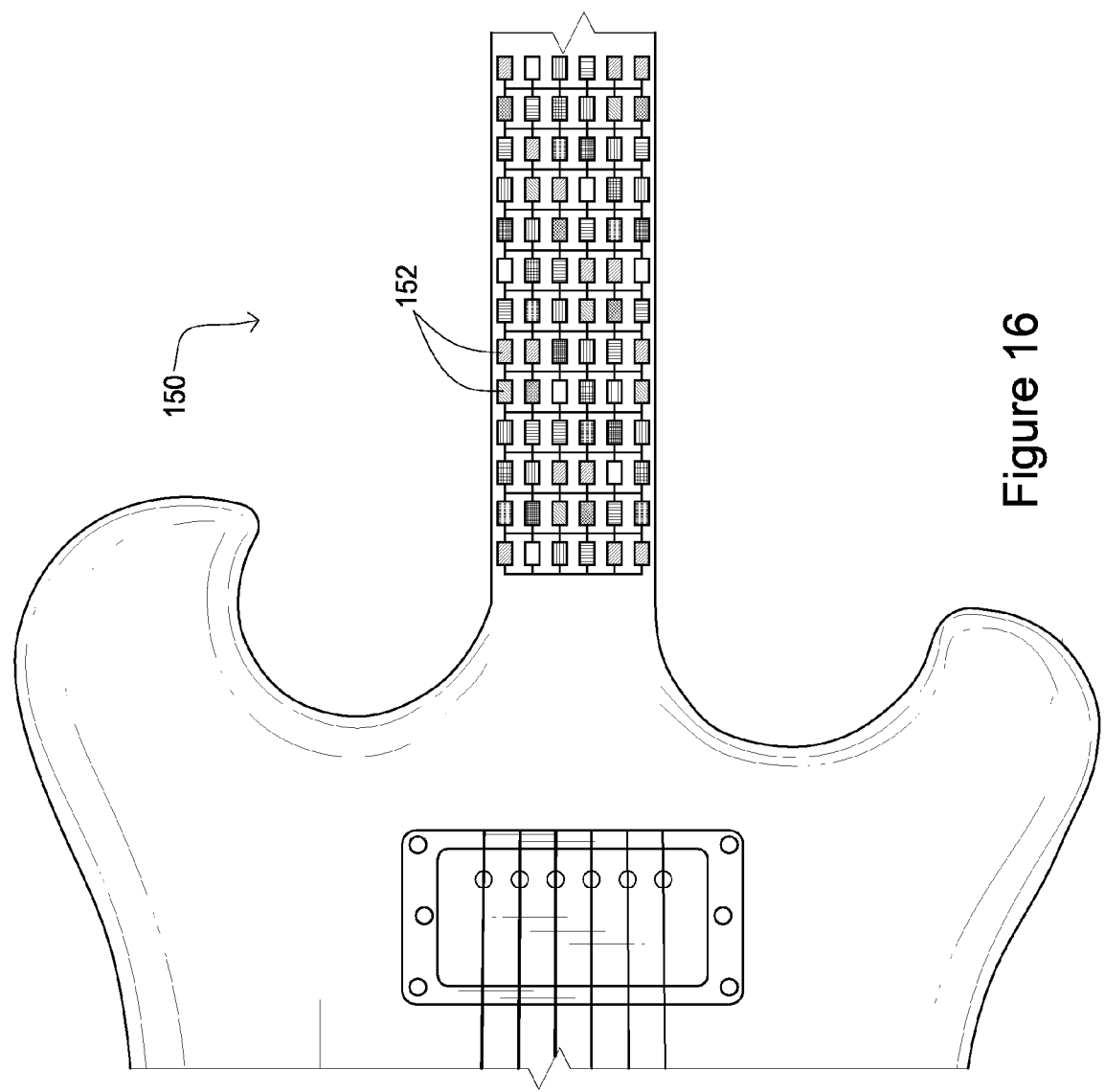
FIG. 16 is a plan view of a fingerboard of a system and apparatus for instructing and displaying musical notation for a stringed instrument, according to one embodiment of the invention.
Figure 17:
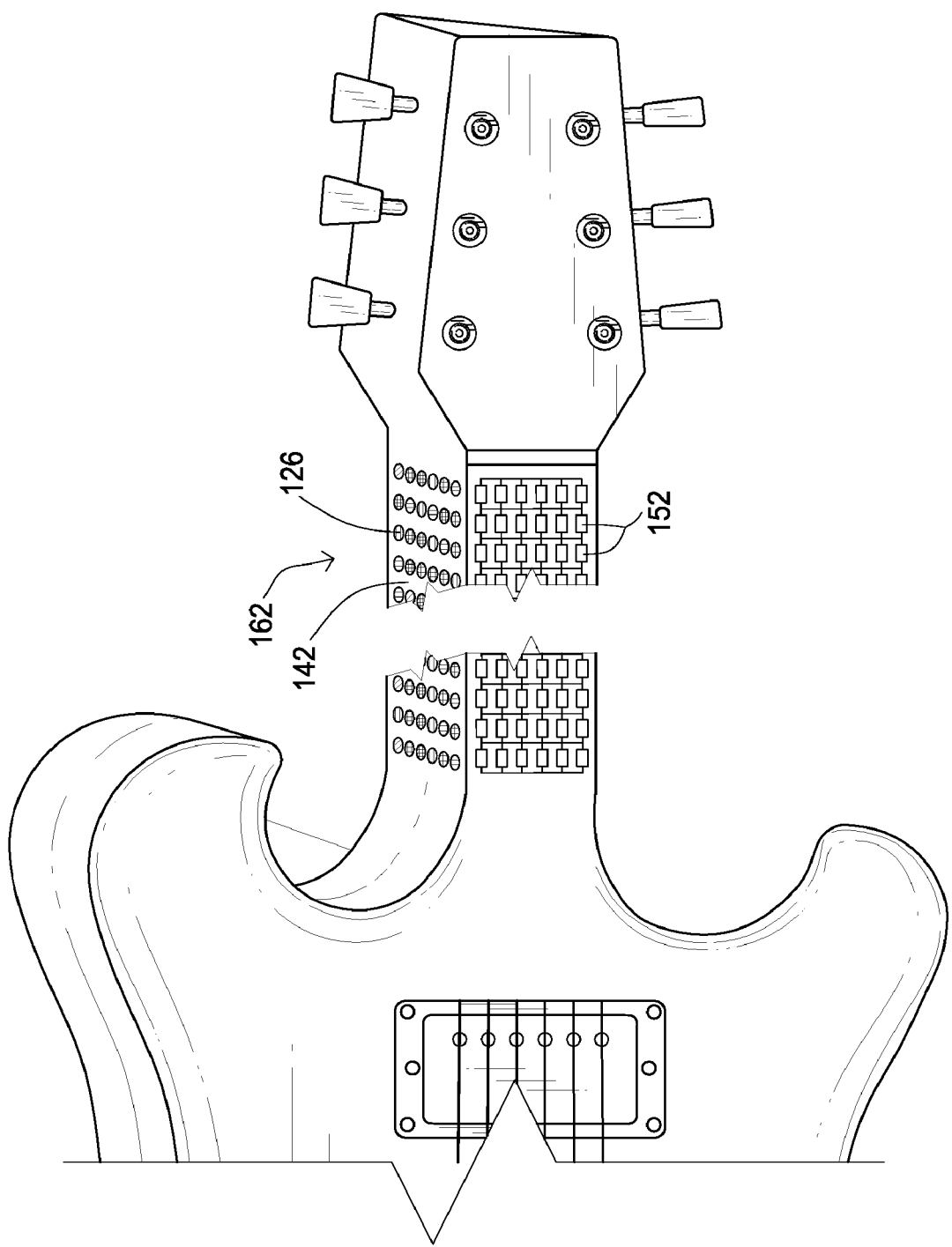
FIG. 17 is a perspective view of a fingerboard of a system and apparatus for instructing and displaying musical notation for a stringed instrument, according to one embodiment of the invention.

FIGS. 15-17 show a user playing an input instrument and an input instrument according to one embodiment of the invention. In particular, the input instrument module is representative of a stringed instrument. The illustrated input instrument module includes a fingerboard 150. The fingerboard comprises: a plurality of fingerboard positions 152, each fingerboard position being coded, the code indexed to a chromatic scale; a fingerboard position indicator 162 disposed along a top portion 142 of the fingerboard configured to provide to a user a reference of the plurality of fingerboard positions; and a music data output module. In one embodiment of the invention, the fingerboard position indicator in electrical communication with at least one of the fingerboard and a control module and provides visual feedback regarding at least one of notes to be played and notes being played. Accordingly, a user may be able to more easily see 140 color coding and/or fingerboard positioning without having to adjust posture or instrument orientation.

A fingerboard may include any components, features, and/or modules contemplated in the art, or as described herein. In one embodiment, the apparatus may enable and/or enhance the portability of the system, method, and/or program code by enabling a user to simply plug the apparatus into any display module. Advantageously, this eliminates the need for computer systems, monitors, and/or so forth.

FIG. 16 particularly illustrates a fingerboard position indicator along the top portion of the input instrument and configured to provide to a user a reference of the plurality of fingerboard positions. The fingerboard position indicators 126 may be coded and/or marked similarly to the fingerboard positions and/or the note positions on the input instrument and the virtual fingerboard, respectively. The fingerboard position indicators may be disposed on the top portion in any manner contemplated in the art such as but not limited to, in an array, vertically, horizontally, diagonally, etc. Additionally, the fingerboard position indicators may comprise any graphic, audio and/or video markings such that the presence and/or information on the fingerboard position indicators are enhanced. The fingerboard positions indicators are disposed along the top portion, thereby enabling a user to view and/or have a reference for the different fingerboard positions on the input instrument. The fingerboard position indicators are particularly advantageous, as during normal use the fingerboard positions are typically facing away from a user, thereby disallowing and/or making it difficult for a user view the fingerboard positions while he or she is playing the input instrument. A non-limiting example of fingerboard lighting devices includes U.S. Pat. No. 5,373,768—Sciortino—Musical Instrument Neck illuminator, which is incorporated by reference herein for its supporting teachings.

In a non-limiting exemplary embodiment, the fingerboard position indicators include highlighting and/or light enhancements. The fingerboard position indicator highlighting and/or light enhancements may be configured and/or in communication with the musical information and/or the music file. In this way when one or more fingerboard positions should be played, the one or more corresponding fingerboard position indicators will light up and/or send a signal to the user.

Additionally, as shown throughout the figures, the apparatus may include a control module. The control module may be incorporated as part of the input instrument module and/or may be in communication with the input instrument module via a network, cables, etc. The control module may be any type and/or kind of control module contemplated in the art and/or include any instructions contemplated in the art, or as described herein.

In another embodiment, the system, apparatus, method and/or program code for instructing a user to read musical notation and/or method may include a plurality of chord illustrators visually displayed on the input instrument module. The plurality of chord illustrators may be visually displayed and/or disposed on the instrument module in any manner contemplated in the art. In a non-limiting example, the chord illustrators may include diagrams and/or chord markings disposed on the fingerboard. The chord illustrators may be embodied in and/or incorporated into a chord illustrator module. Advantageously, the chord illustrators may visually enhance proper finger placement of a plurality of chords, thereby assisting a user to properly learn the fingering positions of chords. The chord illustrator module may include a light and/or power module which functions to light up and/or enhance the visual presence of a particular chord. Additionally, the chord illustrator module may be in communication with the musical information, such that a when a particular chord and/or game object is displayed on the musical information, the corresponding chord illustrator and/or fingerboard positions are visually enhanced.

In one embodiment, the chord illustrator module may be in communication with a fingerboard position indicator module and/or the fingerboard position indicators. The chord illustrator module may function and/or communicate with the fingerboard position indicators modules and the musical information such that the fingerboard positions indicators are visually enhanced similar to the chord illustrator modules.

In a non-limiting exemplary embodiment, the chord illustrator modules comprise commonly played chords. Some non-limiting examples of commonly played chords include: three variations of each of the Major Chords and the Minor Chords; three variations of each of the Major 7 Chords and the Minor 7 Chords; and three variations of Diminished Chords.

In an additional embodiment, the system, apparatus, method and/or program code may include enhancing and/or highlighting the display of the commonly played chords. The highlighting and/or enhancing of the commonly played chords may be accomplished and/or comprise any type and/or kind of features, graphics, etc. contemplated in the art. Some non-limiting examples of highlighting and/or enhancing include: bolding, providing audio alerts, using graphic icons, highlighting, and/or so forth.

Advantageously, highlighting the commonly played chords in conjunction with the chord illustrator modules assists a user in learning and becoming familiar with the chords and/or fingerboard positions most commonly found in musical notation and standard stringed instrument play. Indeed, a user familiar and/or able to play the commonly played chords may be able to accompany and/or play a variety of musical compositions.

In another embodiment, the system and/or method includes providing varying levels of difficulty and/or enabling a user to easily transition between the varying levels, within each of modes one through six. In a non-limiting example, a user may adjust the speed and/or timing of the instruction and/or play. Additionally, any and/or all of modes one through six may include a first and/or easy level, wherein the musical information focuses on instructing a user in rhythm. This instruction may be accomplished in any manner contemplated in the art. In a non-limiting example the user may be simply required to strum the strings of the input instrument in accordance with the rhythm and/or timing of the musical information.

In an additional embodiment, there may be a second and/or medium level of difficulty embodied in each of the six modes. The second and/or medium level may focus on note selection and/or fingering. In a non-limiting example, the musical information may require a user to simply play and/or press the proper fingerboard position.

In yet another embodiment, there may be a third and/or difficult level embodied in each of the six modes. The third and/or difficult level may focus on note selection and/or fingering and on strumming, thereby requiring a user to both select the proper note and strum the guitar in accordance with the musical information.

In another embodiment, the system, apparatus, method and/or program code for instructing a user to read musical notation and/or method may include a setup module and/or setup interface. The setup module and/or setup interface may function to determine and/or enable a user to select which type of input instrument he or she desires to use. Additionally, the setup module may function to enable a user to select a variety of personal and/or musical information preferences and/or settings, such as but not limited to, those features described herein. Further, the setup module may include a tuning module, which may function to test, tune and/or determine the pitch of the input instrument.

In an additional embodiment, the setup module may enable a user to modify and/or adjust the fingerboard ranges and/or pitches and/or frequencies associated with the fingerboard positions and note positions. Indeed, the setup module may enable a user to adjust the input instrument and/or musical information to a variety of frequency ranges, such as but not limited to blues, alto, jazz, and/or so forth.

Figure 18:
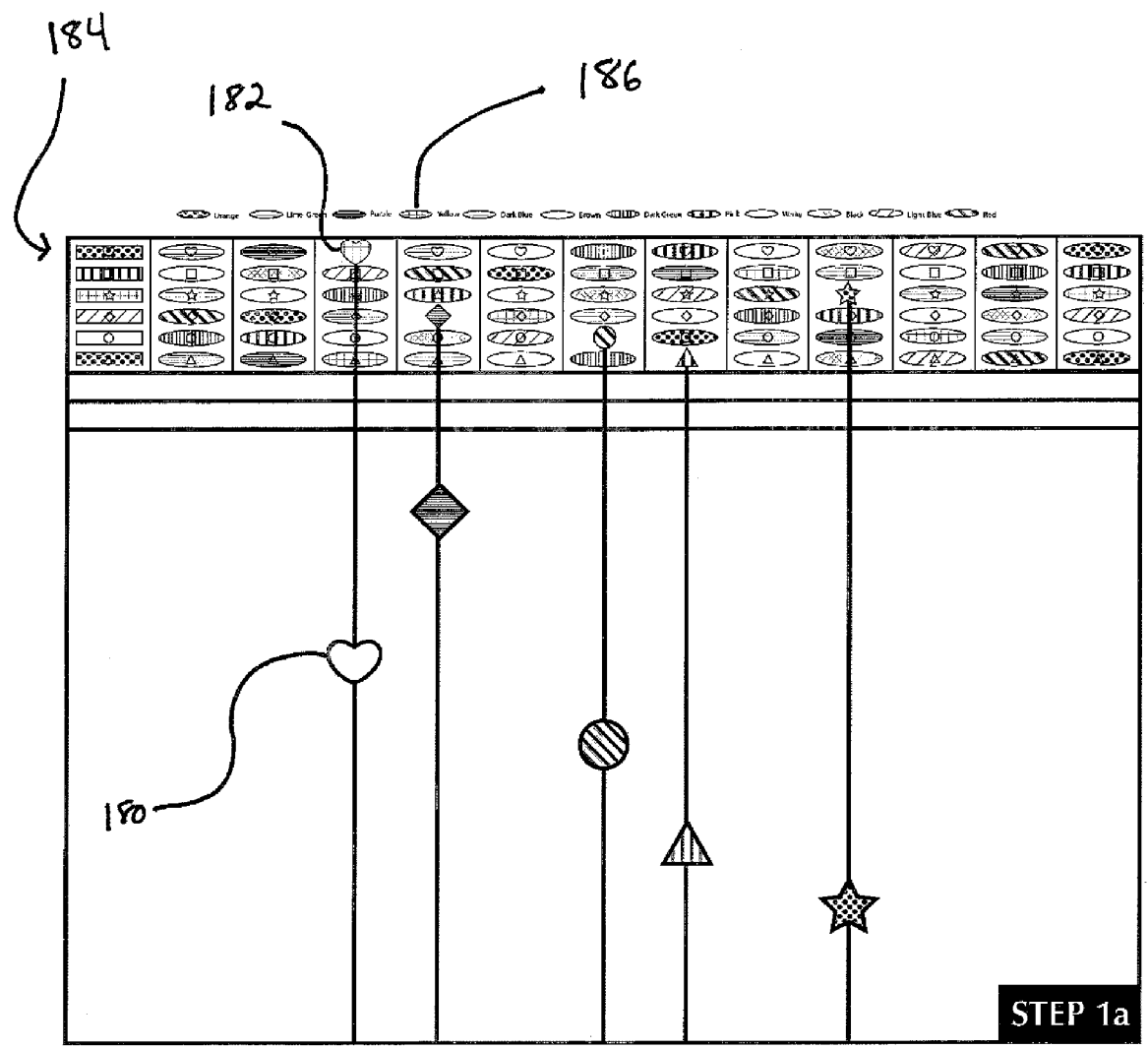
FIGS. 18-23 illustrate graphical displays according to embodiments of the invention.

FIG. 18 illustrates a graphical display according to one embodiment of the invention wherein one or more note positions 182 and linear arrays/strings 184 are graphically altered and/or enhanced. As shown, the one or more note positions 180 are graphically altered/enhanced in accordance with the presence of a note position's corresponding game object 180 on the display. In the illustrated non-limiting example, the graphical alteration includes enlarging and visually contrasting the icon/symbols of note positions with displayed game objects from those note positions with undisplayed game objects. Indeed, one skilled in the art would recognize any types and/or kinds of graphical alterations/enhancements may be used to visually and graphically enhance and/or contrast the note positions. Some these enhancements may include, but are not limited to, flashing, blinking, contrasting colors, etc. Advantageously, the graphical alteration/enhancement of a note position assists a user in more readily recognizing the proper position, fingering, and/or pitch of displayed game objects.

Figure 19:
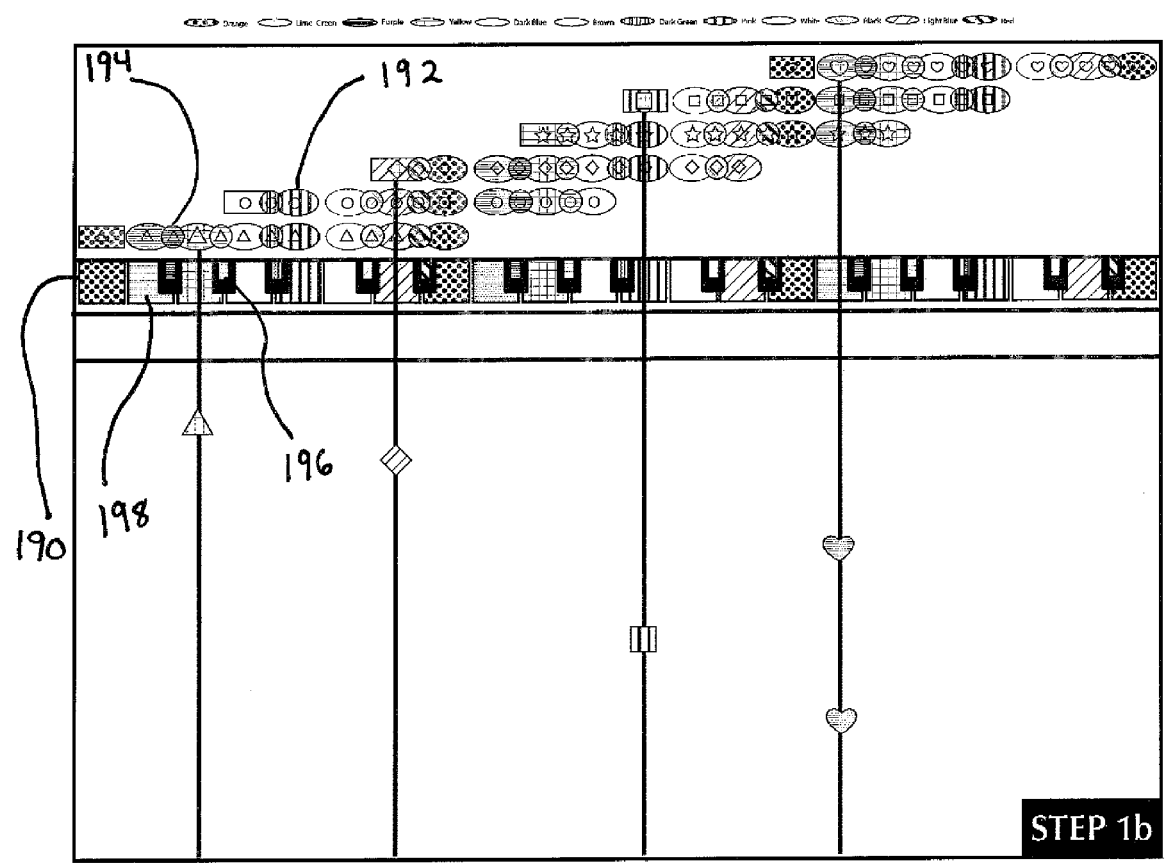

FIG. 19 illustrates an exploded or stair-step view, wherein a display similar to that of FIG. 18 has been altered to vertically align frequency ranges of adjacent strings. There is also shown a virtual keyboard 190 disposed substantially adjacent to the virtual fingerboard. The virtual keyboard 190 includes a plurality of virtual keys 196, 198, each virtual key 196, 198 being color coded according to a chromatic scale. As shown, the virtual keys 196, 198 are color coded indexed to the color coding of the virtual fingerboard 184 and note positions. Additionally, the note positions are graphically coordinated to the virtual keys according to pitch/frequency and type of virtual key. As shown, each note position and virtual key includes a color coding indexed to the chromatic scale.

Also illustrated, the size/shape of the note position 192, 194 is demonstrative of the virtual key type, the virtual key type being either black 196 or white 198. Those note positions representative of black virtual keys are shaped and/or visually contrasted to those note positions representative of white keys. The contrasting shapes or enhancements may be any type and/or kind contemplated in the art. As illustrated, the note positions are represented by ovals and circles representing black and white, respectively. Advantageously, the addition of the virtual keyboard and the coordination of the virtual keyboard with the virtual fingerboard further assist in progressing a user toward standard musical notation. Indeed, differentiating note position shapes in accordance to either black or white virtual keys assists a user in visually connecting the various flats and/or sharps on a typical keyboard with those flats and/or sharps on a typical fingerboard.

Figure 20:
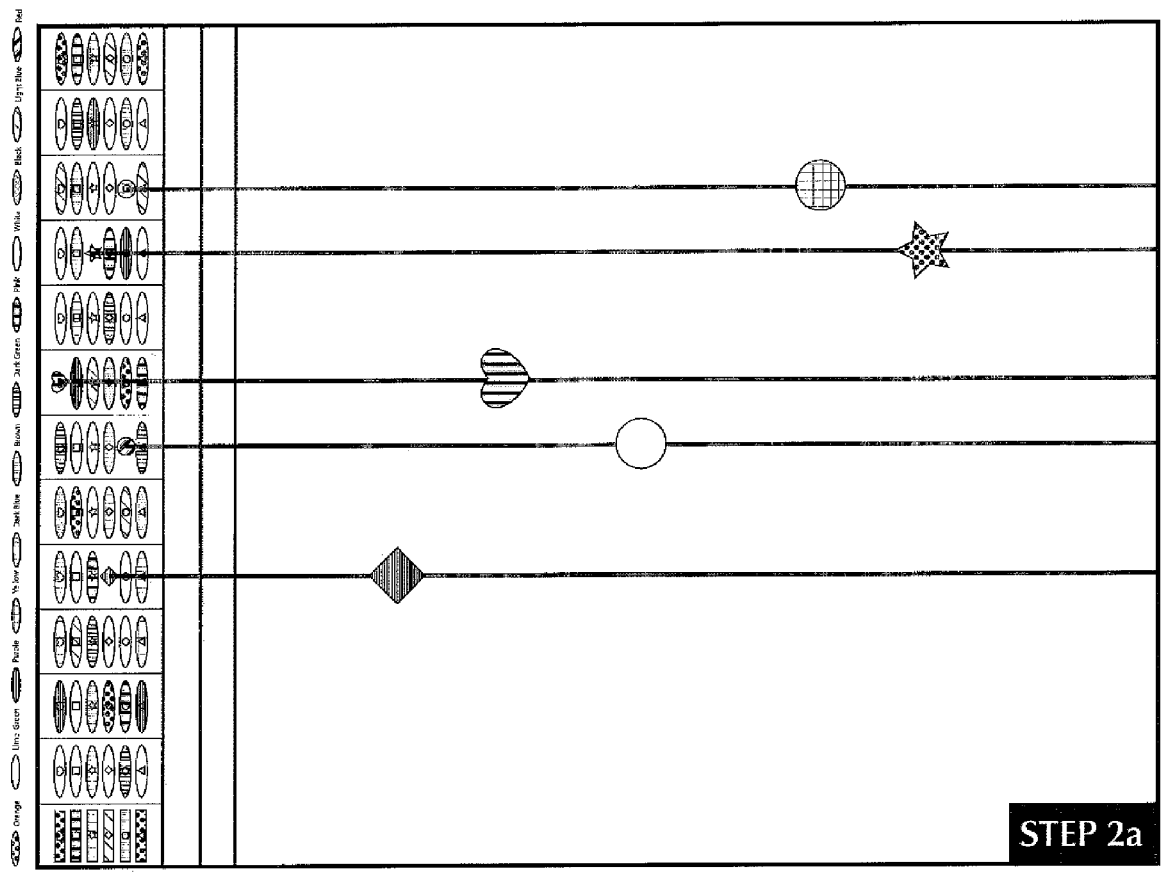
Figure 21:
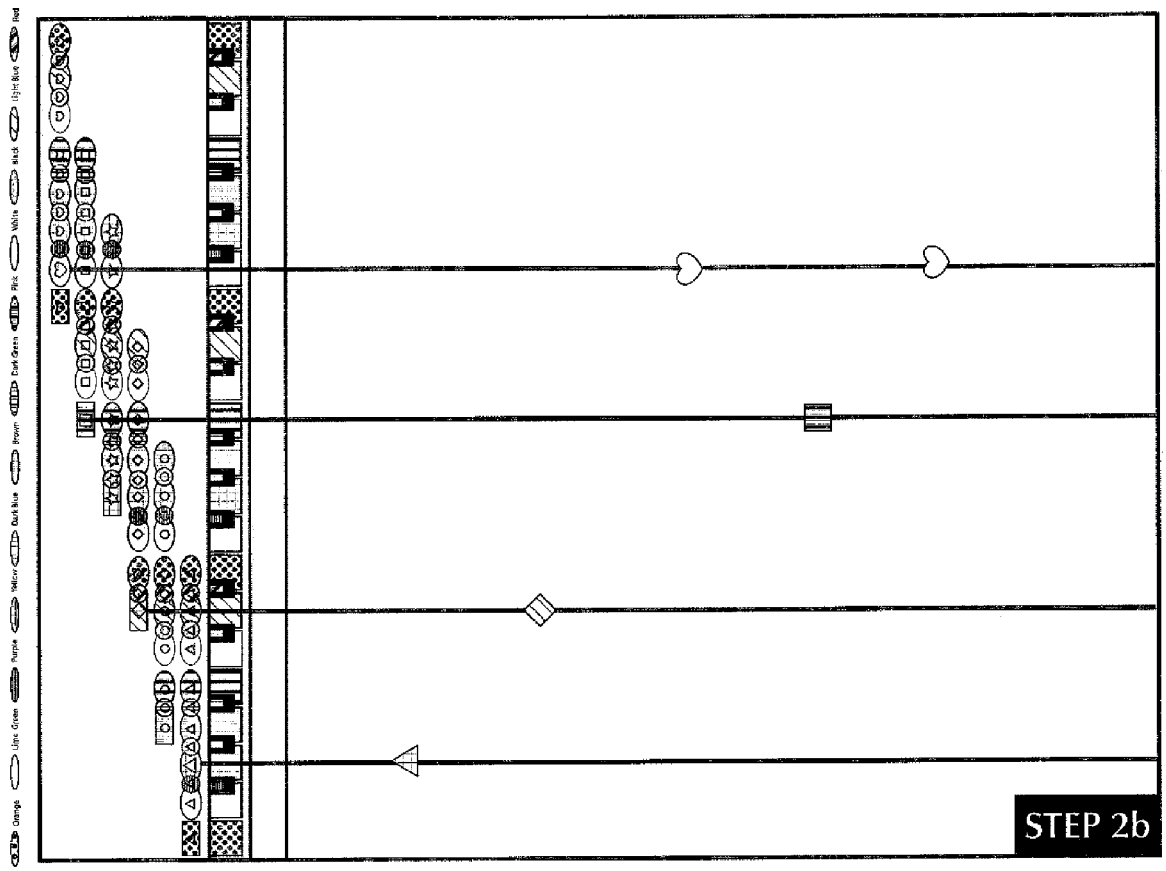

FIGS. 20 and 21 illustrate modes, wherein displays similar to those of FIGS. 18 and 19, respectively, have been rotated ninety degrees. Accordingly, the game objects representing notes travel right to left towards the target area. The modified virtual fingerboard is positioned substantially on a left side of the display; the notes and/or game objects continue to move along the substantially straight trajectory toward the virtual fingerboard in a horizontal rather than vertical trajectory. In this mode, the displayed musical information is increasingly similar to standard musical notation, as the notes and/or game objects are oriented in a horizontal manner similar to standard musical notation.

Figure 22:
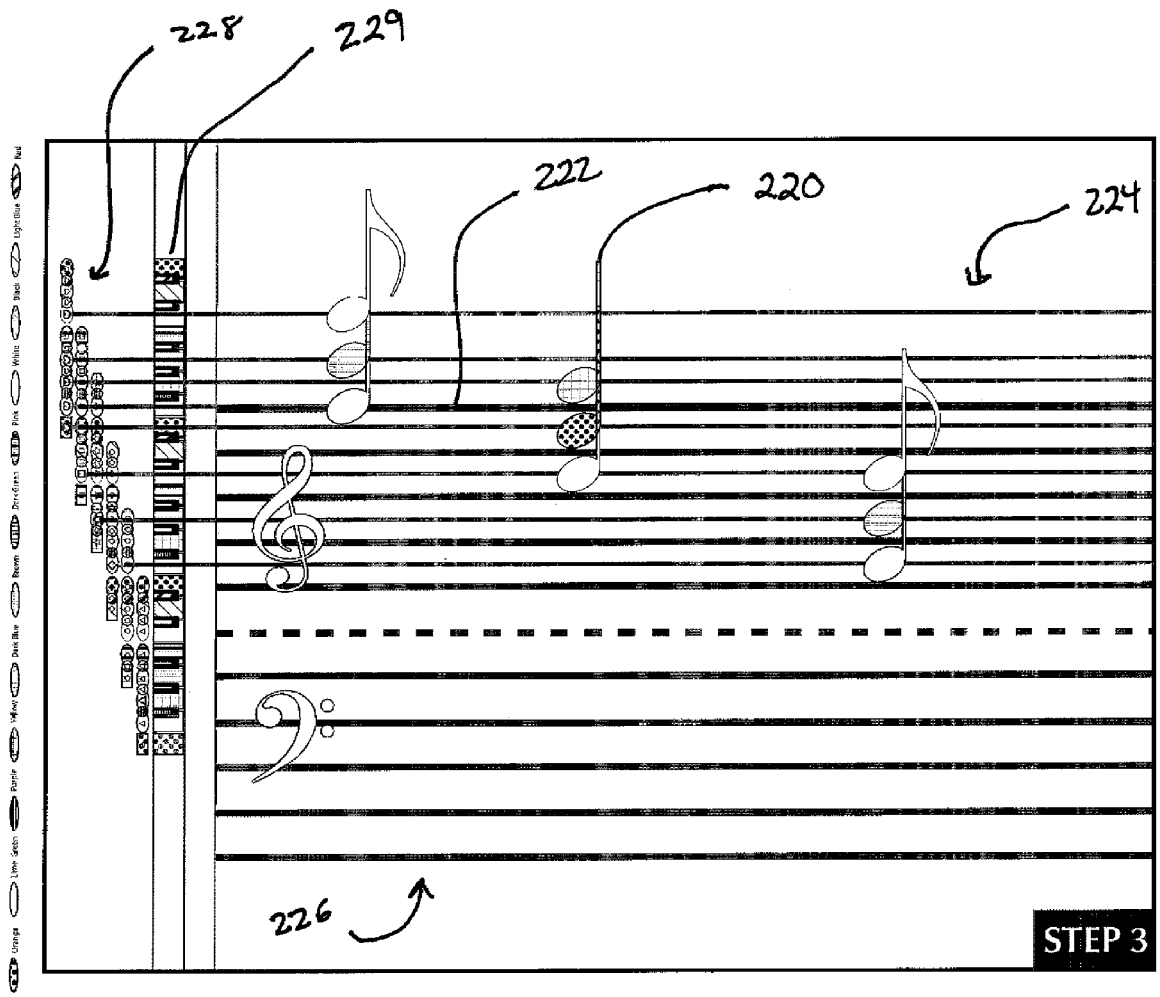

FIG. 22 illustrates a display including staff lines 222 and a treble clef 224 and a bass clef 226. Further, game objects 220 are illustrated in the shape of standard notes having color coding associated with notes to be played. In contrast to FIG. 10, there is a note indicator or virtual fingerboard displayed 228 and a virtual keyboard. It is additionally envisioned that the display may include one or both of the virtual fingerboard 228 and the virtual keyboard 229. Advantageously, the inclusion of the virtual fingerboard 228 and/or the virtual keyboard may provide the necessary connector and/or interface between the fingerboard positions and the standard musical staff and/or notation.

Figure 23:
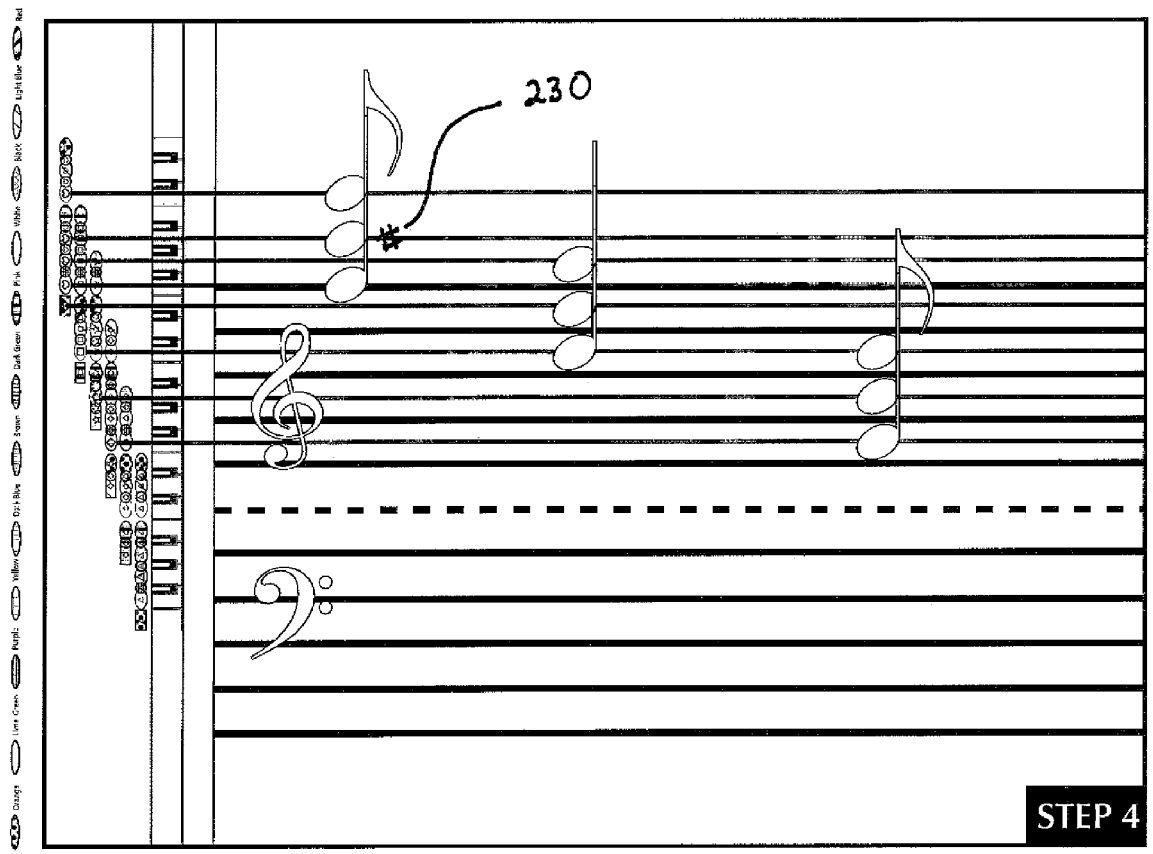

FIG. 23 illustrates the display of FIG. 22, however, the color coding is removed and standard musical notation cues 230 are provided as one of the final steps in instructing a user to read musical notation. Additionally, the virtual fingerboard 228 and/or the virtual keyboard 229 remain in the display, thus providing the necessary connector and/or interface between the fingerboard positions and the standard musical staff and/or notation.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures indicate the note positions and the fingerboard positions on the virtual fingerboard and the input instrument, respectively, include color markings, it is contemplated that the note positions and/or the fingerboard positions may be coded in any manner contemplated in the art. Some non-limiting examples of coding include: patterns, symbols, markers recognizable via touch and/or feel, and/or so forth.

Additionally, although the figures illustrate the rectangular shape of the plurality of note positions on the virtual fingerboard and the input instrument, it is understood the plurality of note positions and fingerboard positions may be indicated and/or comprised of any shape and/or form contemplated in the art. Some non-limiting examples of note positions and fingerboard positions include: square, elliptical, circular, and/or so forth.

Further, although FIGS. 18 through 23 illustrate a legend 186 in the display, it is contemplated the legend may not be incorporated into the display and/or user interface. In contrast, in one embodiment, the legend 186 functions to indicate meaning of the various illustrations throughout FIGS. 18 through 23 for the purpose of this application.

In an alternative embodiment, the note positions and/or fingerboard positions on the virtual fingerboard and input instrument, respectively, may be coded via Braille and/or other such markings which are recognizable via touch or feel. A non-limiting example of such an embodiment may be found in U.S. Pat. No. 7,051,292 issued to Nagase, which is incorporated by reference herein.

Further, although the target area is only illustrated in FIG. 5, it is understood and contemplated that the target area may be displayed and/or function in any and all of the graphical interfaces and embodiments of the present invention. Some non-limiting examples include the graphical interfaces shown in FIGS. 1 through 10.

Again, although the figures illustrate a six stringed input instrument and virtual fingerboard it is envisioned that the input instrument and virtual fingerboard may comprise any stringed instrument contemplated in the art, such as but not limited to, guitar, violins, cellos, sitars, etc.

It is also envisioned that the musical information and/or input instrument may be adjusted and/or modified for users which use the left and/or right hand and/or fingers for play on a fingerboard. In a non-limiting example, the musical information may be adjusted for a left handed user by placing the virtual fingerboard at the substantial bottom extreme of the interface and subsequently directing the game objects vertically downward.

While particular modes are described and illustrated to be implemented in a particular order, it is envisioned that there are one or more embodiments wherein such modes may be implemented in any order and/or in a different order than that illustrated. Further, modes may be implemented in an animated sequence, as a screen refresh, or otherwise.

It is further envisioned that any of the above features, functions, module, embodiments, etc. described herein may be incorporated and/or embodied in a computer readable storage medium comprising computer readable program code and configured to execute on a processor.

It is expected that the invention may include numerous variations of the designs and/or include a variety of aesthetic features, such as but not limited to logos, icons, music and/or other symbols, and/or so forth.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method of instructing a user to read musical notation through interaction with a graphical user interface and an input instrument representative of a stringed instrument, comprising the steps of:
   a) generating the graphical user interface, having a first mode, including a virtual fingerboard positioned substantially along a vertical extreme of the interface, the virtual fingerboard including:
      a first linear away representing a first string having a first frequency range;
      a second linear array representing a second string having a second frequency range, wherein the second frequency range overlaps the first frequency range associated with a string; and
      a plurality of note positions, each note position having a corresponding fingerboard position on the input instrument;
      wherein the first linear array, the second linear array, and the plurality of note positions form a grid;
   b) displaying the first linear away and the second linear array in a second mode such that portions of the first linear away and the second linear array having overlapping frequency ranges are substantially vertically aligned;
   c) incorporating a music file into the graphical user interface, wherein the music file contains data corresponding to an arrangement of a plurality of musical notes in sequence, having a rhythmic pattern, and represented by at least one game object; and
   d) directing the game object in substantially vertical and substantially straight trajectory, toward a note position on the virtual fingerboard corresponding to the musical notes.

2. The method of claim 1, further comprising rotating the virtual fingerboard interface according to a third mode, wherein the virtual fingerboard interface is rotated approximately ninety (90) degrees such that the virtual fingerboard is positioned substantially on a left side of the interface, and the game object continues to move along the substantially straight trajectory toward the virtual fingerboard.

3. The method of claim 1, further comprising displaying a third linear away and not displaying the first linear away and the second linear array according to a fourth mode, wherein the third linear array includes a third frequency range, the third frequency range substantially including both the first frequency range and the second frequency range.

4. The method of claim 3, further comprising displaying the third linear array according to a fifth mode, wherein at least two different note frequencies are displayed along a substantially similar trajectory.

5. The method of claim 1, wherein the game object comprises a visual note group indicator configured to visually indicate to a user a simultaneous play of two or more notes.

6. The method of claim 5, wherein the visual note group indicator comprises a visual connector, configured to visually connect the two or more notes in a note group.

7. The method of claim 1, further comprising a playing field, wherein the vertical axis of the playing field simultaneously represents string selection and timing.

8. The method of claim 1, further comprising coding the virtual fingerboard, the coding being indexed to a chromatic scale.

9. The method of claim 8, further comprising coding each fingerboard position on the input instrument, indexed to the coding of the virtual fingerboard.

10. The method of claim 9, wherein the coding comprises colors.

11. The method of claim 9, further comprising displaying at least one fingerboard position indicator along the top portion of the input instrument configured to provide to a user a reference of the plurality of fingerboard positions.

12. The method of claim 11, wherein the fingerboard position indicator is color coded indexed to the color coding of the virtual fingerboard.

13. The method of claim 1 further comprising awarding a value to the user based on the user striking the corresponding note position on the input instrument approximately simultaneously with the collisions.

14. The method of claim 1, further comprising colliding the game object with the corresponding note position according to the rhythmic pattern of the arrangement.

15. A computer readable storage medium comprising computer readable program code for instructing a user to read musical notation through interaction with a graphical user interface and an input instrument representative of a stringed instrument and configured to execute on a processor, the program code including instructions for performing the steps of:
   a) generating the graphical user interface, having a first mode, including a virtual fingerboard positioned substantially along a vertical extreme of the interface, the virtual fingerboard including:
  a1) a first linear array representing a first string having a first frequency range;
  a2) a second linear array representing a second string having a second frequency range, wherein the second frequency range overlaps the first frequency range; and
  a3) a plurality of note positions, each note position having a corresponding fingerboard position on the input instrument;
  a4) wherein the first linear array, the second linear array, and the plurality of note positions form a grid;
b) displaying the first linear away and the second linear array in a second mode such that portions of the first linear away and the second linear array having overlapping frequency ranges are substantially vertically aligned;
c) incorporating a music file into the graphical user interface, wherein the music file contains data corresponding to an arrangement of a plurality of musical notes in sequence, having a rhythmic pattern, and represented by at least one game object; and
d) directing the game object in substantially vertical and substantially straight trajectory, toward a note position on the virtual fingerboard corresponding to the musical notes.

16. A system for instructing a user to read musical notation through interaction with a graphical user interface and an input instrument representative of a stringed instrument, the system comprising:
  a) a display module configured to display data;
  b) an input instrument module representative of a stringed instrument in communication with the display module, the input instrument module having a fingerboard, the fingerboard including a plurality of note positions, each note position being color indexed to a chromatic scale;
  c) a control module in communication with the display module, and comprising instructions for directing the display module;
  d) a graphical user interface module, the graphical user interface module comprising instructions for:
    d1) generating a virtual fingerboard positioned substantially at a top portion of the interface, the virtual fingerboard including:
      d1a) a first linear array representing a first string having a first frequency range;
      d1b) a second linear array representing a second string having a second frequency range, wherein the second frequency range overlaps the first frequency range; and
      d1c) a plurality of note positions, each note position having a corresponding fingerboard position on the input instrument, wherein the first linear array, the second linear array, and the plurality of note positions form a grid; and
    d2) displaying the first linear away and the second linear array in a second mode such that portions of the first linear array and the second linear array having overlapping frequency ranges are substantially vertically aligned.

17. The system of claim 16, further comprising a music data storage module in communication with the control, and configured to store music data.

18. The system of claim 16, wherein the graphical user interface module further comprises instructions for coding the virtual fingerboard, the coding being indexed to a chromatic scale.

19. The system of claim 16, wherein the input instrument further comprises at least one fingerboard position indicator along the top portion of the input instrument configured to provide to a user a reference of the plurality of fingerboard positions.

* * * * *